United States Patent
Ogata et al.

(10) Patent No.: US 10,977,504 B2
(45) Date of Patent: Apr. 13, 2021

(54) VEHICLE-MOUNTED IMAGE TARGET OBJECTION RECOGNITION DEVICE

(71) Applicant: Clarion Co., Ltd., Saitama (JP)

(72) Inventors: Takehito Ogata, Tokyo (JP); Masahiro Kiyohara, Saitama (JP); Daisuke Fukuda, Saitama (JP); Yoshitaka Uchida, Saitama (JP)

(73) Assignee: Clarion Co., Ltd., Saitama (JP)

( * ) Notice: Subject to any disclaimer, the term of this patent is extended or adjusted under 35 U.S.C. 154(b) by 84 days.

(21) Appl. No.: 16/467,234

(22) PCT Filed: Aug. 31, 2017

(86) PCT No.: PCT/JP2017/031424
§ 371 (c)(1),
(2) Date: Jun. 6, 2019

(87) PCT Pub. No.: WO2018/105179
PCT Pub. Date: Jun. 14, 2018

(65) Prior Publication Data
US 2020/0074192 A1    Mar. 5, 2020

(30) Foreign Application Priority Data

Dec. 7, 2016 (JP) .............................. JP2016-237258

(51) Int. Cl.
*G06K 9/00* (2006.01)
*G06K 9/46* (2006.01)

(52) U.S. Cl.
CPC ..... *G06K 9/00812* (2013.01); *G06K 9/00201* (2013.01); *G06K 9/00798* (2013.01); *G06K 9/4604* (2013.01)

(58) Field of Classification Search
CPC ........... G06K 9/00812; G06K 9/00201; G06K 9/00798; G06K 9/4604; H04N 7/18;
(Continued)

(56) References Cited

U.S. PATENT DOCUMENTS

2012/0268602 A1   10/2012   Hirai et al.
2014/0104422 A1   4/2014   Choi et al.
(Continued)

FOREIGN PATENT DOCUMENTS

JP   2011-150688 A   8/2011
JP   2012-80497 A   4/2012
(Continued)

OTHER PUBLICATIONS

Extended European Search Report issued in European Application No. 17878703.2 dated Jul. 14, 2020 (seven pages).
(Continued)

*Primary Examiner* — Christopher Wait
(74) *Attorney, Agent, or Firm* — Crowell & Moring LLP

(57) ABSTRACT

A vehicle-mounted image processing device 1000 acquires an image around a host vehicle 10, senses a feature amount of a target object present on a road surface from the image, and relative position coordinates with respect to the host vehicle 10, acquires information of a three-dimensional object around the host vehicle 10 and relative position coordinates of the three-dimensional object, distinguishes whether the feature amount is a feature amount of a feature on the road surface or a feature amount of a feature on the three-dimensional object by using a positional relationship between the feature amount and the three-dimensional object, and recognizes the target object by using a feature on the road surface. As a result, a vehicle-mounted image processing device, which is capable of avoiding misrecognition of a part of a three-dimensional object as a target object when sensing the target object present on a road surface such as a parking bay by using a camera image, is provided.

9 Claims, 28 Drawing Sheets

(58) Field of Classification Search
CPC .......... B60R 21/00; B60W 30/06; G06T 7/00; G06T 7/60; G08G 1/16
See application file for complete search history.

(56) References Cited

U.S. PATENT DOCUMENTS

2016/0110619 A1* 4/2016 Kim .................. B60W 30/06
382/104
2016/0140718 A1 5/2016 Ishida

FOREIGN PATENT DOCUMENTS

| JP | 2014-6588 A | 1/2014 |
| JP | 2014-117989 A | 6/2014 |
| JP | 2016-99172 A | 5/2016 |

OTHER PUBLICATIONS

Jung et al., "Two-Touch Type Parking Slot Marking Recognition for Target Parking Position Designation", IEEE Intelligent Vehicles Symposium, Jun. 4, 2008, pp. 1161-1166, XP031318910, six pages.
International Search Report (PCT/ISA/210) issued in PCT Application No. PCT/JP2017/031424 dated Oct. 17, 2017 with English translation (five (5) pages).
Japanese-language Written Opinion (PCT/ISA/237) issued in PCT Application No. PCT/JP2017/031424 dated Oct. 17, 2017 (four (4) pages).

* cited by examiner

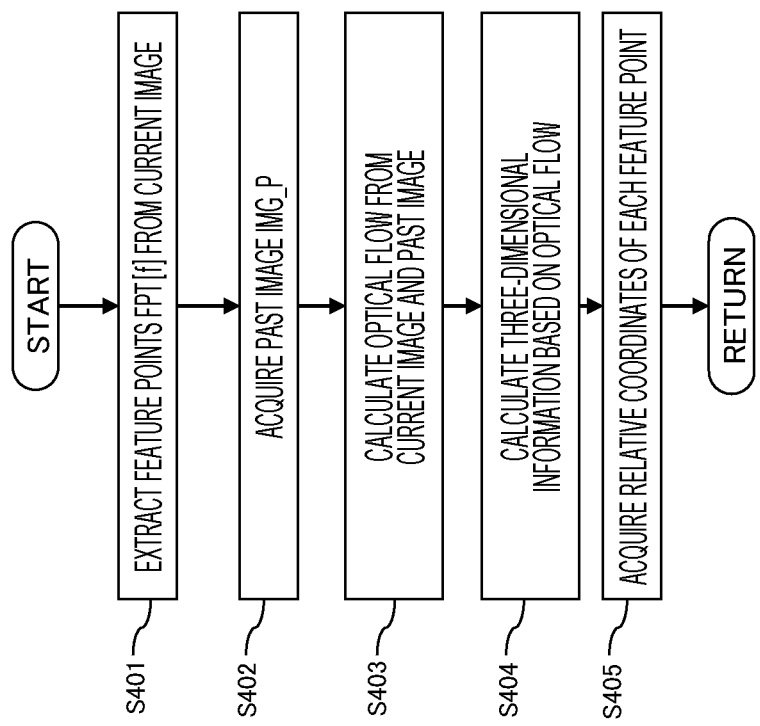

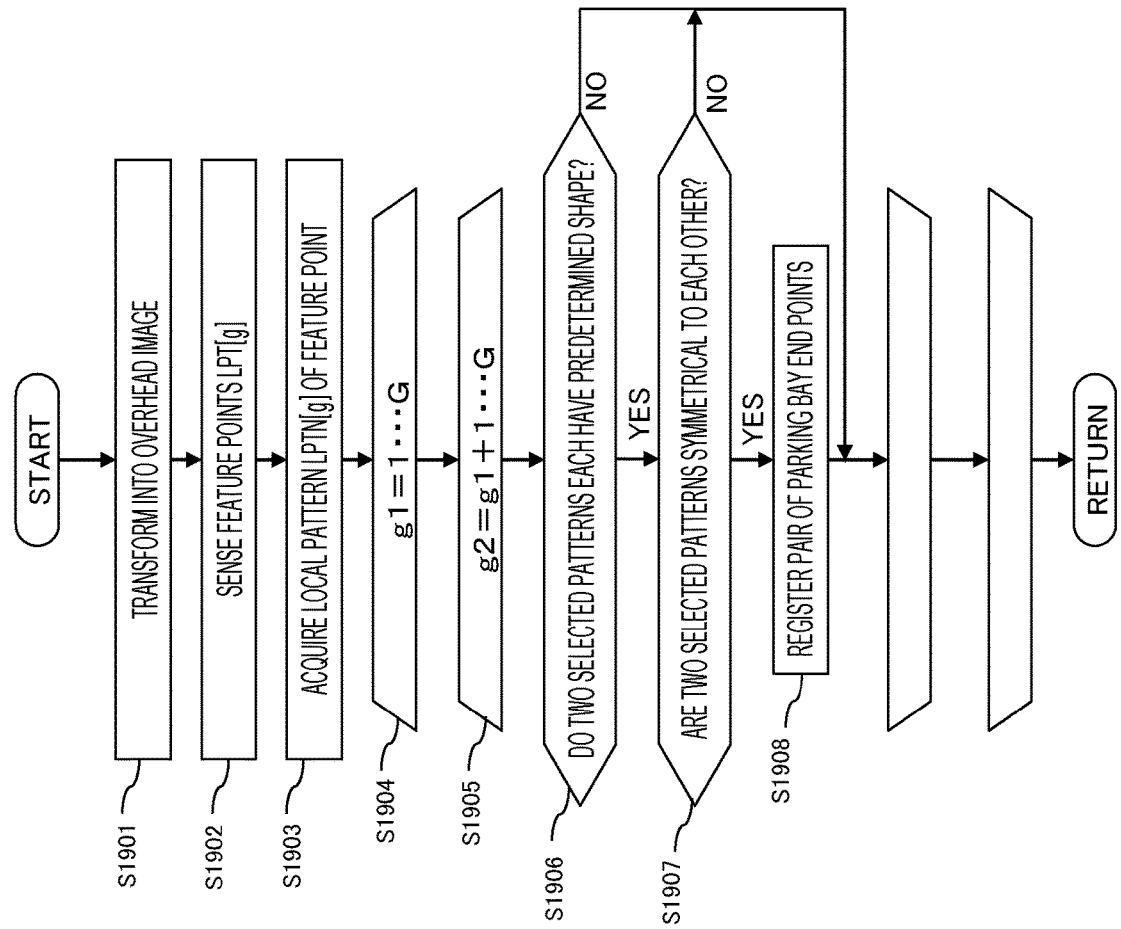

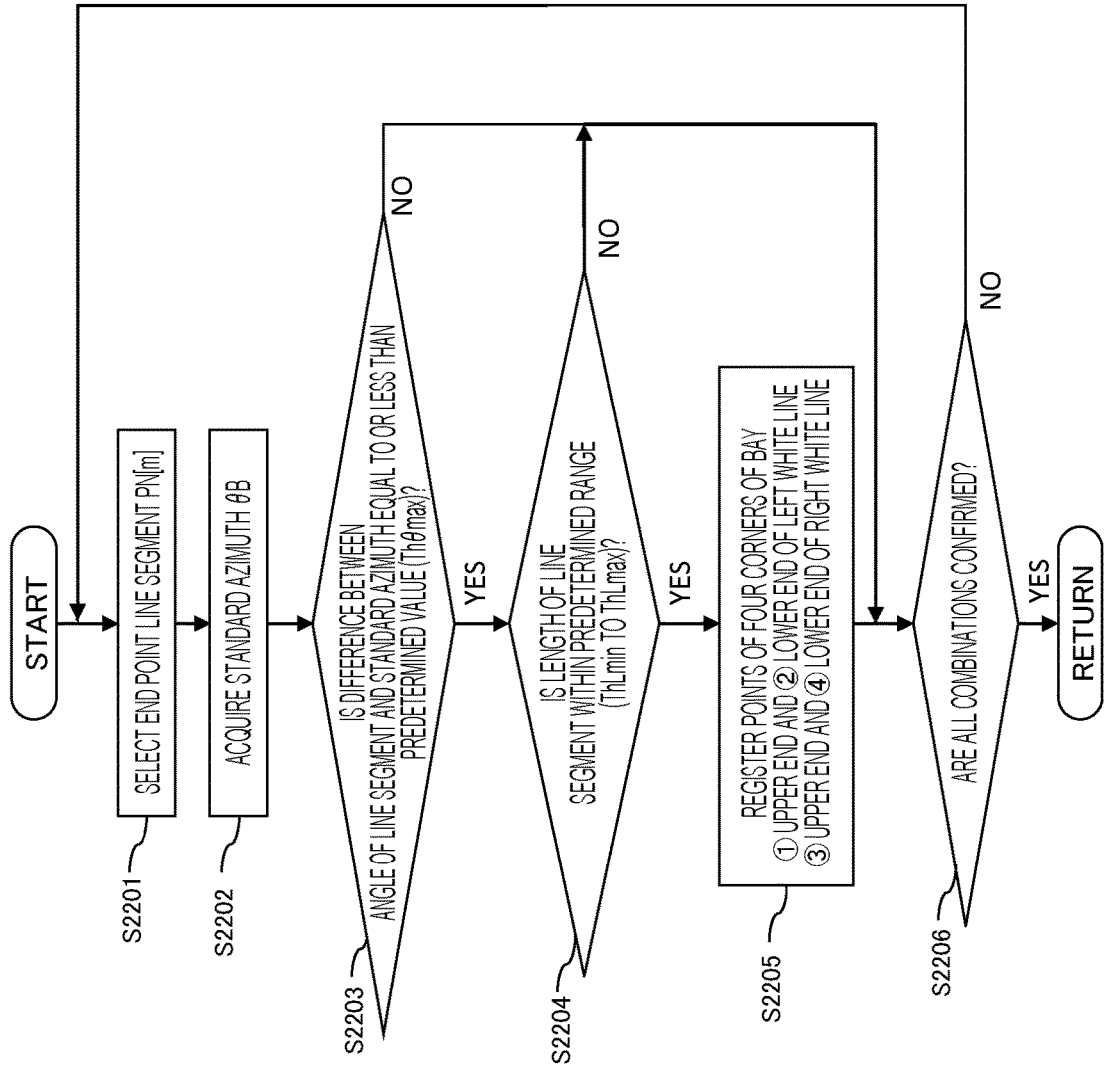

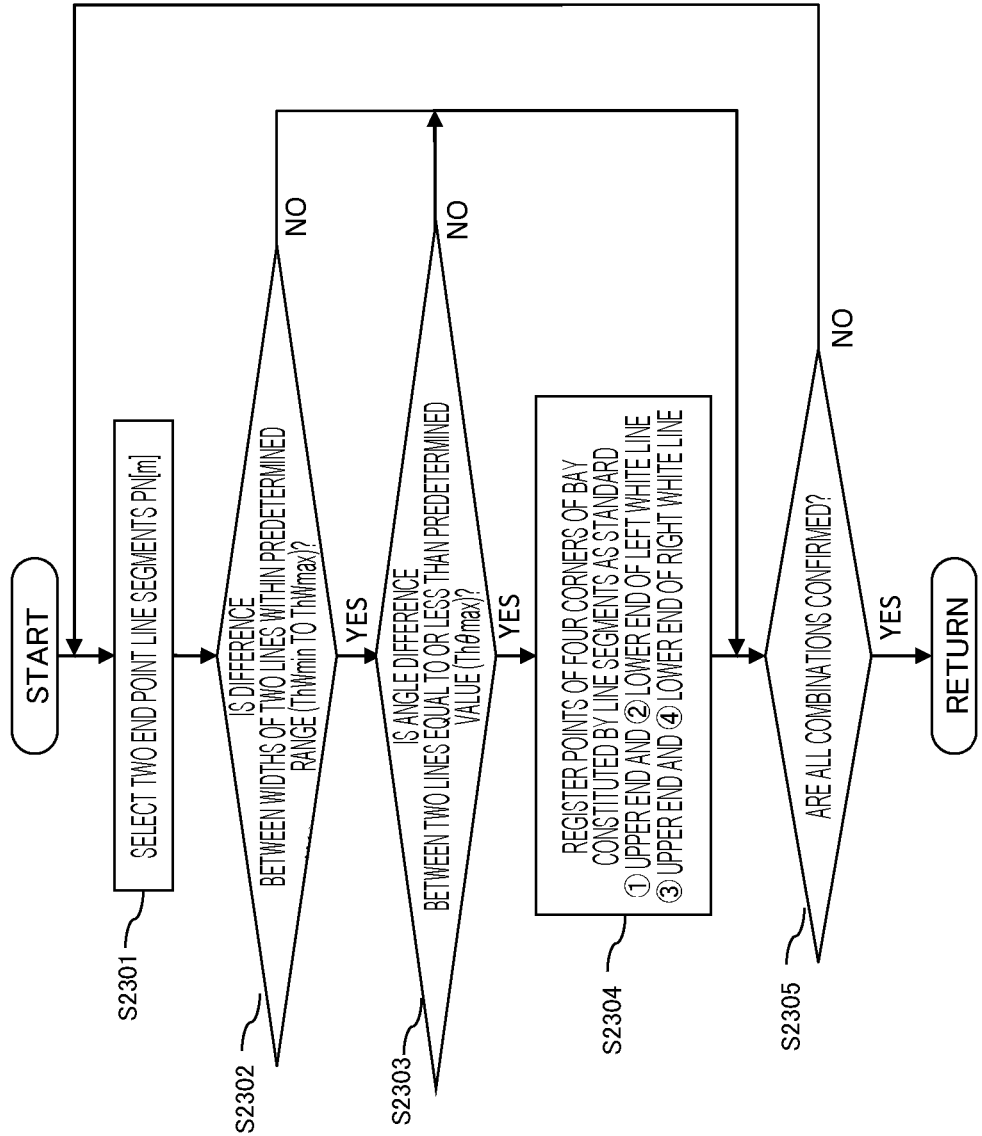

VEHICLE-MOUNTED IMAGE TARGET OBJECTION RECOGNITION DEVICE

TECHNICAL FIELD

The present invention relates to a vehicle-mounted image processing device which is suitably used when a vehicle control for assisting in a driving operation of a driver is performed, or the like.

BACKGROUND ART

PTL 1 discloses a parking bay sensing device including: imaging means that captures an image of an area behind a vehicle; edge extraction means that extracts edges from the captured image; image conversion means that converts the image with the edges extracted therefrom into an overhead image; area division means that divides the converted overhead image into left and right areas; straight line sensing means that senses straight lines in each area by Hough transform from the divided left and right areas; first determination means that determines whether or not the sensed straight line is an end of a line having a width; and second determination means that creates a combination of two straight lines for each of the left and right areas from a plurality of the straight lines determined to be an end of a line having a width, and determines whether or not the combination corresponds to both ends of a line having a width, for the purpose of accurately sensing straight lines to be candidates of both left and right ends of a line of a parking bay, preventing erroneous sensing of an unrelated straight line as both ends of the line of the parking bay, and accurately sensing the parking bay.

CITATION LIST

Patent Literature

PTL 1: JP 2012-80497 A

SUMMARY OF INVENTION

Technical Problem

In recent years, a system of sensing a parking bay by using a camera to support a parking operation of a driver has been developed. For example, an autonomous parking system of sensing a parking bay around a host vehicle and automatically performing a parking operation of a driver partially or totally, and the like have been commercialized.

In a case where a parking bay is sensed by using a camera, the sensing is performed by using edge information generated based on a difference in a brightness between a white line and a road surface. In this case, when there is a shadow near the white line of the parking bay, an edge generated due to the shadow is misrecognized as the parking bay in some cases. As a countermeasure for such a misrecognition, for example, PTL 1 described above discloses a technology of checking a falling edge which is present near a rising edge by using a fact that a white line has two edges with different brightness change directions, thereby preventing an influence of an edge generated by a shadow.

However, three-dimensional object information cannot be obtained from a camera image. For this reason, for example, a bumper, a side sill, a coating, or the like of a parked car which is adjacent to a parking bay looks the same as a white line of the parking bay in the image and a rising edge and a falling edge are also paired, such that an edge of the side sill and the white line are paired to thereby be misrecognized as the parking bay. That is, a part of the three-dimensional object is misrecognized as the parking bay, which is problematic.

The present invention has been made in view of the problems described above, and an object of the present invention is to provide a vehicle-mounted image processing device capable of avoiding misrecognition of a part of a three-dimensional object as a target object when sensing the target object present on a road surface such as a parking bay by using a camera image.

Solution to Problem

In order to solve the above problems, for example, configurations described in the claims are adopted.

The present invention includes a plurality of means for solving the problems described above, and an example of the means is a vehicle-mounted image processing device recognizing a target object around a host vehicle, the vehicle-mounted image processing device including: an image acquisition unit which acquires an image around the host vehicle captured by an imaging unit; a feature amount extraction unit which extracts, from the image around the host vehicle acquired by the image acquisition unit, a feature amount of the target object and coordinate information of the feature amount with respect to the host vehicle when it is assumed that a feature having the feature amount is on a road surface; a three-dimensional object information storage unit which acquires and stores coordinate information of a three-dimensional object around the host vehicle with respect to the host vehicle; a feature amount distinguishing unit which distinguishes whether the feature amount is a feature amount of a feature on the road surface or a feature amount of a feature on the three-dimensional object by using a positional relationship between the coordinate information of the feature amount sensed by the feature amount extraction unit with respect to the host vehicle and the coordinate information of the three-dimensional object stored in the three-dimensional object information storage unit with respect to the host vehicle; and a target object recognition unit which recognizes the target object by using the feature amount distinguished as a feature amount of a feature on the road surface by the feature amount distinguishing unit.

Advantageous Effects of Invention

According to the present invention, it is possible to avoid misrecognition of a part of a three-dimensional object as a target object when sensing the target object present on a road surface such as a parking bay by using a camera image. Problems to be solved, configurations, and effects other than those described above are clarified from the description of the following embodiments.

BRIEF DESCRIPTION OF DRAWINGS

FIG. 4 is a flowchart illustrating a processing performed by a three-dimensional object sensing unit according to the first embodiment.

FIG. 19 is a flowchart illustrating a processing performed by an end point feature sensing unit according to the third embodiment.

FIG. 22 is a flowchart illustrating a processing performed by a parking bay recognition unit according to the third embodiment.

FIG. 23 is a flowchart illustrating an example of another processing performed by the parking bay recognition unit according to the third embodiment.

DESCRIPTION OF EMBODIMENTS

Hereinafter, a vehicle-mounted image processing device according to an embodiment of the present invention which senses a target object on the ground such as a parking bay, a road surface painting, or a curbstone based on information from an image sensor such as a camera and is suitably used when a vehicle control for assisting in a parking operation of a driver is performed depending on a sensing result will be described with reference to the drawings.

First Embodiment

Figure 1:
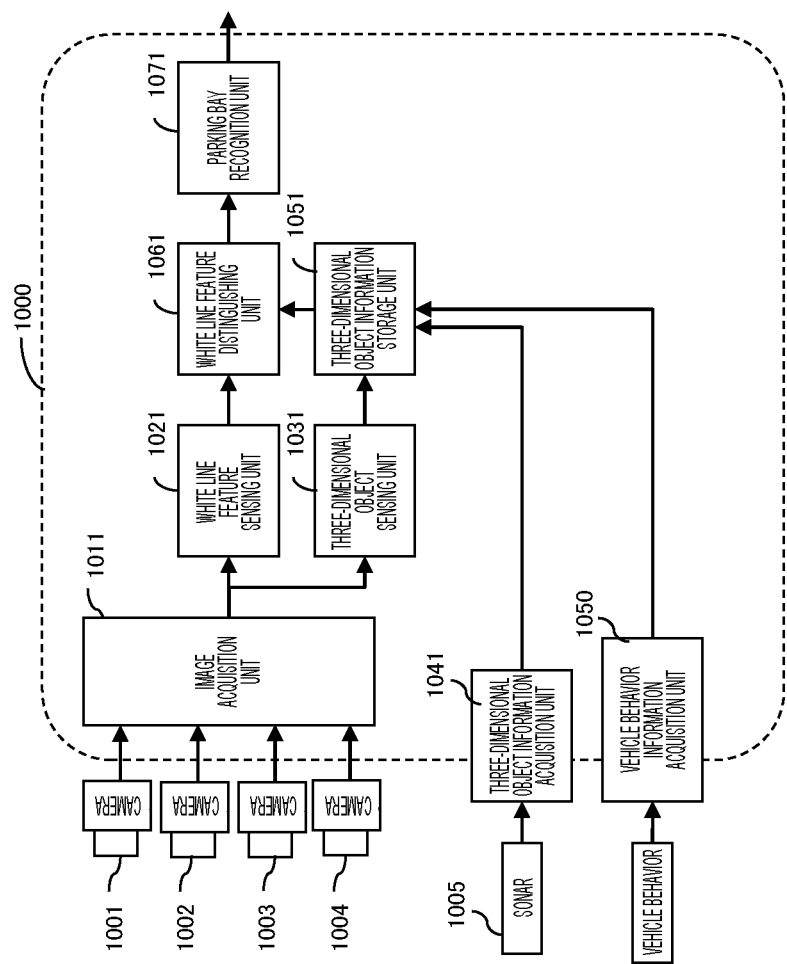
FIG. 1 is a block diagram of a vehicle-mounted image processing device according to a first embodiment of the present invention.

Hereinafter, a vehicle-mounted image processing device according to a first embodiment of the present invention will be described with reference to FIGS. 1 to 14. FIG. 1 is a block diagram of a vehicle-mounted image processing device 1000 according to the first embodiment.

The vehicle-mounted image processing device 1000 is a device which is embedded in a camera device mounted on a vehicle, an integrated controller, or the like, and senses an object in an image captured by cameras 1001 to 1004 of the camera device. The vehicle-mounted image processing device 1000 according to the present embodiment is configured to sense a parking bay around a host vehicle 10 as a target object.

The vehicle-mounted image processing device 1000 is constituted by a computer including a central processing unit (CPU), a memory, an I/O, and the like. A predetermined processing is programmed and is repeatedly performed in a predetermined cycle T.

As illustrated in FIG. 1, the vehicle-mounted image processing device 1000 includes an image acquisition unit 1011, a white line feature sensing unit (feature amount extraction unit) 1021, a three-dimensional object sensing unit 1031, a three-dimensional object information acquisition unit 1041, a vehicle behavior information acquisition unit 1050, a three-dimensional object information storage unit 1051, a white line feature distinguishing unit (feature amount distinguishing unit) 1061, and a parking bay recognition unit (target object recognition unit) 1071.

Figure 2:
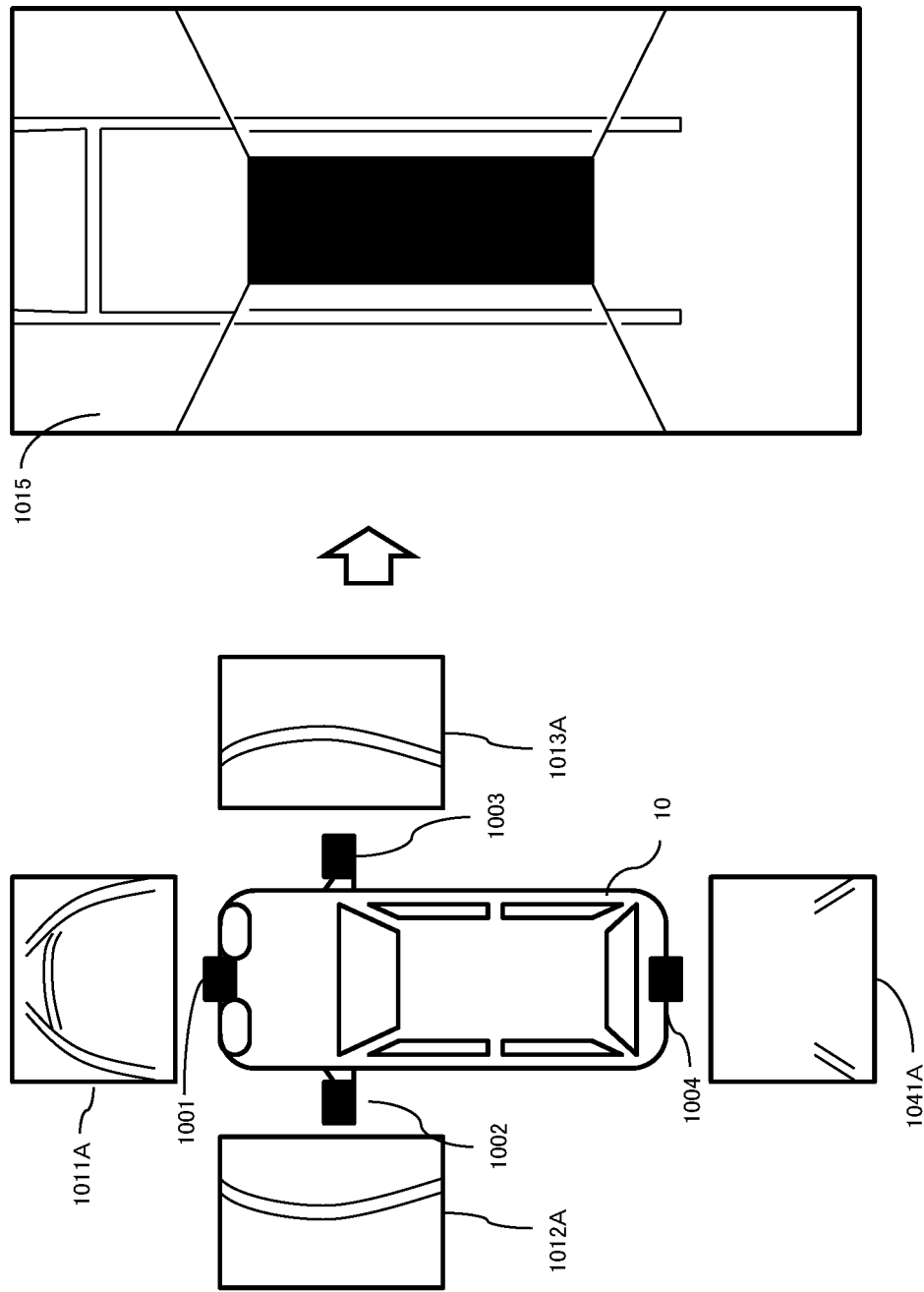
FIG. 2 is a view illustrating an example of a processing performed by an image acquisition unit according to the first embodiment.

The image acquisition unit 1011 acquires images 1011A, 1012A, 1013A, and 1014A obtained by imaging an area around the host vehicle 10 by cameras (imaging unit) 1001, 1002, 1003, and 1004 attached at positions at which the cameras 1001, 1002, 1003, and 1004 can image the area around the host vehicle 10 as illustrated in FIG. 2. Then, the acquired images 1011A, 1012A, 1013A, and 1014A are geometrically transformed and synthesized to generate an overhead image 1015 viewed from a virtual viewpoint above the host vehicle 10, and the overhead image 1015 is stored in a random access memory (RAM). A parameter for the geometric transformation and synthesis is set in advance by calibration performed at the time of vehicle shipping. It should be noted that the overhead image 1015 is a two-dimensional array and is represented by IMGSRC[x][y]. x and y each represent a coordinate of an image.

The white line feature sensing unit 1021 senses a white line feature LC[n] in the overhead image 1015 acquired by the image acquisition unit 1011. The white line feature LC[n] includes information on coordinates of a relative position of the white line feature to the host vehicle 10 in the coordinate system (world coordinate) with the center of an axle of rear wheels of the host vehicle 10 as an origin, and is a one-dimensional array having a table as an element. n represents an ID when a plurality of white line features are sensed. Details of a processing therefor will be described later.

The three-dimensional object sensing unit 1031 senses a distance point group IPT[b] which shows distance coordinates of a three-dimensional object around the host vehicle 10 by using the images 1011A, 1012A, 1013A, and 1014A acquired by the camera 1001, 1002, 1003, and 1004, respectively. The distance point group IPT[b] is a one-dimensional array having a table including information such as distance coordinates of the three-dimensional object as an element, and b represents an ID when a plurality of distance point groups IPT[b] are sensed. Details of a processing therefor will be described later.

The three-dimensional object information acquisition unit 1041 acquires three-dimensional object information, which is present around the host vehicle 10 and is sensed by a sonar 1005 installed in the front, the rear, and the side of the host vehicle 10, as a distance point group SPT[c]. The distance point group SPT[c] is a one-dimensional array having a table including information such as distance coordinates of the three-dimensional object or the like as an element, and c represents an ID when a plurality of distance point groups SPT[c] are sensed.

The vehicle behavior information acquisition unit 1050 acquires a vehicle behavior DRC calculated by using a pulse of a tire of the host vehicle 10, or the like in an EC mounted in the host vehicle 10 or the vehicle-mounted image processing device 1000 through an in-vehicle network CAN or the like. The vehicle behavior DRC includes information of a speed (VX and VY) with respect to the world coordinate system and a yaw rate (YR).

The three-dimensional object information storage unit 1051 integrates and stores the distance point group IPT[b] sensed by the three-dimensional object sensing unit 1031, the distance point group SPT[c] acquired by the three-dimensional object information acquisition unit 1041, and the vehicle behavior DRC acquired by the vehicle behavior information acquisition unit 1050 as a three-dimensional object point group OPT[d] including a past sensing result. Details of a processing therefor will be described later.

The white line feature distinguishing unit 1061 distinguishes a white line LN[m] on a road surface among the white line features LC[n] by using the white line feature LC[n] obtained by the white line feature sensing unit 1021, the three-dimensional object point group OPT[d] integrated and stored in the three-dimensional object information storage unit 1051, and camera geometric information CLB which is information on a coordinate position of the camera in the world coordinate system. Details of a processing therefor will be described later.

The parking bay recognition unit 1071 recognizes a parking bay by using the white line LN[m] distinguished as being present on the road surface by the white line feature distinguishing unit 1061. Details of a processing therefor will be described later.

Information of the parking bay recognized by the parking bay recognition unit 1071 is output to another control unit or the like in the host vehicle 10, other than the vehicle-mounted image processing device 1000, and is used when another control unit performs each control such as an automatic driving control, an automatic parking control, a parking assistance control, or the like.

[White Line Feature Sensing Unit 1021]

Figure 3:
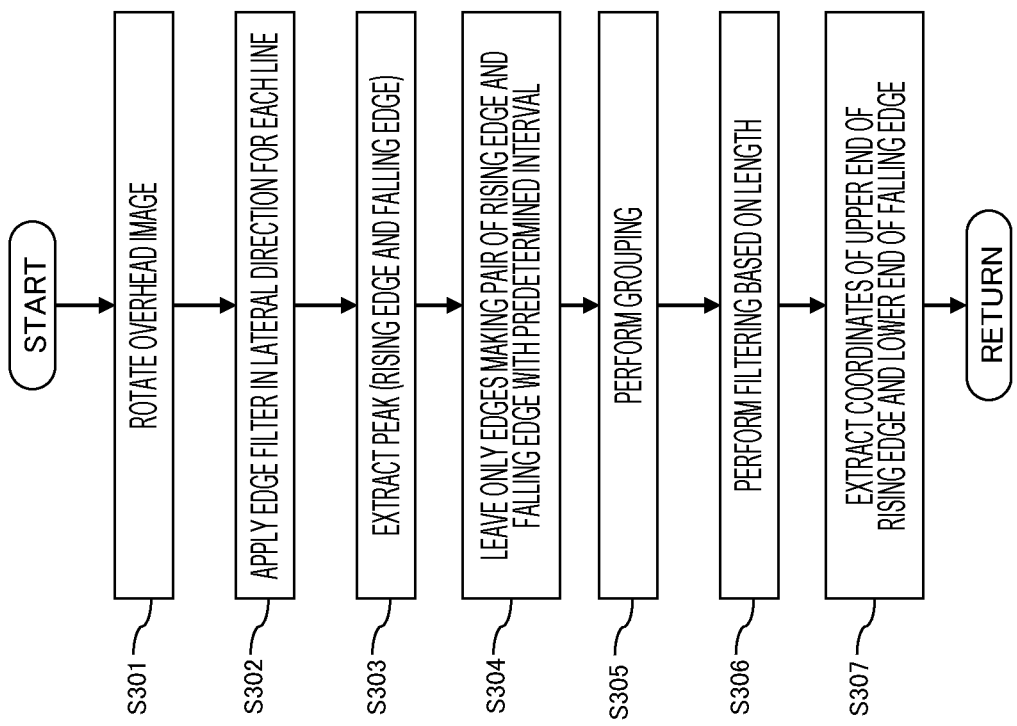
FIG. 3 is a flowchart illustrating a processing performed by a white line feature sensing unit according to the first embodiment.

Next, contents of a processing performed by the white line feature sensing unit 1021 will be described with reference to FIG. 3. FIG. 3 is a flowchart illustrating a flow of a processing performed by the white line feature sensing unit 1021.

The white line feature sensing unit 1021 may perform a processing for the entire overhead image 1015 or may define a processing region. In the present embodiment, an upper half portion of the overhead image 1015 is set as the processing region when the host vehicle is stopped or moves forward, and a lower half portion of the overhead image 1015 is set as the processing region when the host vehicle moves backward, based on a shift position.

First, the overhead image 1015 is rotated by 90 degrees in step S301.

Then, in step S302, an edge filter in a lateral direction (a vertical direction in the image before rotation) is applied for each line within a processing region while performing scanning from the left to the right of the image. The following steps S303 and S304 are performed for each line.

Next, an edge point at which an output value of the edge filter reaches a peak is sensed in step S303. A rising edge (a change point from dark to bright) Eu[nu] and a falling edge (a change point from bright to dark) Ed[nd] are extracted as the peak, respectively.

The white line on the road surface has a brightness value higher than a brightness value of the road surface, and thus a rising edge is present at the left side of the white line and a falling edge is present at the right side. In order to capture the feature, in step S304, only a pair of edges Ep[np], in which a falling edge is present within a predetermined range (a maximum thickness of the sensed white line which is defined in advance) on the right side of the image from a rising edge, among rising edge points Eu[nu] and falling edge points Ed[nd] sensed in step S303, is left, and other single edges are regarded as singular points and thus are eliminated.

A series of the processing in steps S302 to S304 described above is performed for each line within the processing region.

Then, among pairs of edges Ep[np] extracted in step S304, pairs of edges Ep[np] in which edges are aligned in a straight line are grouped, thereby generating a straight line candidate group Lg[ng] in step S305. Through this processing, pairs of edges in which edges are not aligned in a straight line are eliminated. Hough transform known in the art can be used for grouping of the white line aligned in a straight line.

Then, in step S306, a filtering processing, in which a line with a length equal to or smaller than a predetermined length among lines of the straight line candidate group Lg[ng] is eliminated, is performed.

Then, in step S307, information of image coordinates of an upper end (start point) of a rising edge and a lower end (end point) of a falling edge and coordinates of a relative portion to the host vehicle in the world coordinate system which are calculated based on the overhead image 1015 is stored as an element of the white line feature LC[n], the rising edge and the falling edge remaining in the group.

Here, although the case where the image is rotated in step S301 and a series of the processing in steps S302 to S307 is performed for the rotated image has been described, a processing of scanning the overhead image 1015 without rotating the overhead image 1015 in a top-bottom direction, and using a filter for sensing an edge in a lateral direction can also be performed.

[Three-Dimensional Object Sensing Unit 1031]

Figure 5B:
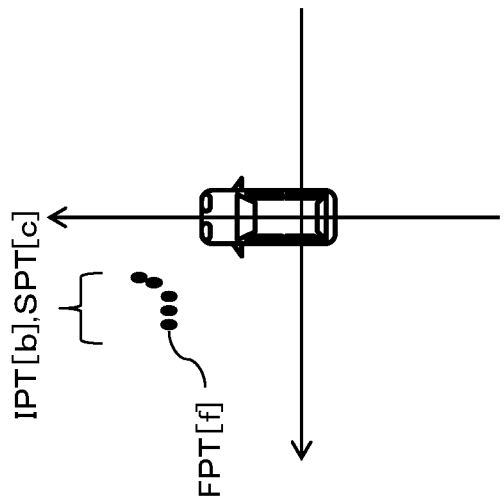
FIG. 5B is a diagram for describing a processing performed by the three-dimensional object sensing unit according to the first embodiment.
Figure 5A:
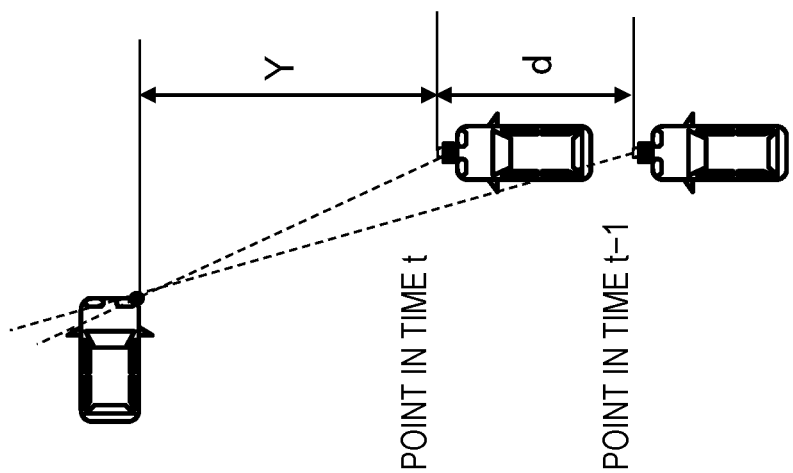
FIG. 5A is a diagram for describing a processing performed by the three-dimensional object sensing unit according to the first embodiment.

Next, contents of a processing performed by the three-dimensional object sensing unit 1031 will be described with reference to FIGS. 4 to 5B. FIG. 4 is a flowchart illustrating a flow of a processing performed by the three-dimensional object sensing unit 1031. FIGS. 5A and 5B are diagrams for describing a processing performed by the three-dimensional object sensing unit 1031.

The three-dimensional object sensing unit 1031 performs a processing for any one or more of images 1011A, 1012A, 1013A, and 1014A. That is, the three-dimensional object sensing unit 1031 may perform a processing for only one image or may perform a processing for all the images. According to the present embodiment, the three-dimensional object sensing unit 1031 performs a processing for an image in a movement direction depending on a shift position of the host vehicle.

First, in step S401, feature points FPT[f] are extracted from a current image IMG_C which is a processing target. A known method such as the Harris corner method is used for the extraction of the feature points FPT[f].

Then, in step S402, a past image IMG_P before a predetermined time, which is acquired by a camera imaging the image from which the feature points FPT[f] are extracted, is acquired.

Next, in step S403, a corresponding position of each feature point FPT[f] of the current image IMG_C in the past image IMG_P is calculated by an optical flow method, and movement vectors FPT_VX[f] and FPT_VY[f] of each feature point are acquired. As the optical flow method, a known method such as the Lucas-Kanade method is used.

Then, in step S404, a three-dimensional position of each feature point FPT[f] around the host vehicle 10 is calculated by using the feature point FPT[f] and the movement vectors FPT_VX[f] and FPT_VY[f]. As a method for the calculation, known means is used.

Finally, in step S405, the three-dimensional position of each feature point is converted into the coordinate system (world coordinate system) with the center of the axle of the rear wheels of the vehicle as the origin and is stored as the distance point group IPT[b].

As illustrated in FIGS. 5A and 5B, the calculation is performed based on a principle in which a distance is measured by using a fact that as a past position of the host vehicle and a current position of the host vehicle are changed, parallax occurs. Distances of the respective feature points in the image are measured. Therefore, a result of performing the measurement with respect to, for example, a parked vehicle is obtained as a group of a plurality of points with world coordinates as illustrated in FIG. 5B.

[Three-Dimensional Object Information Storage Unit 1051]

Figure 6:
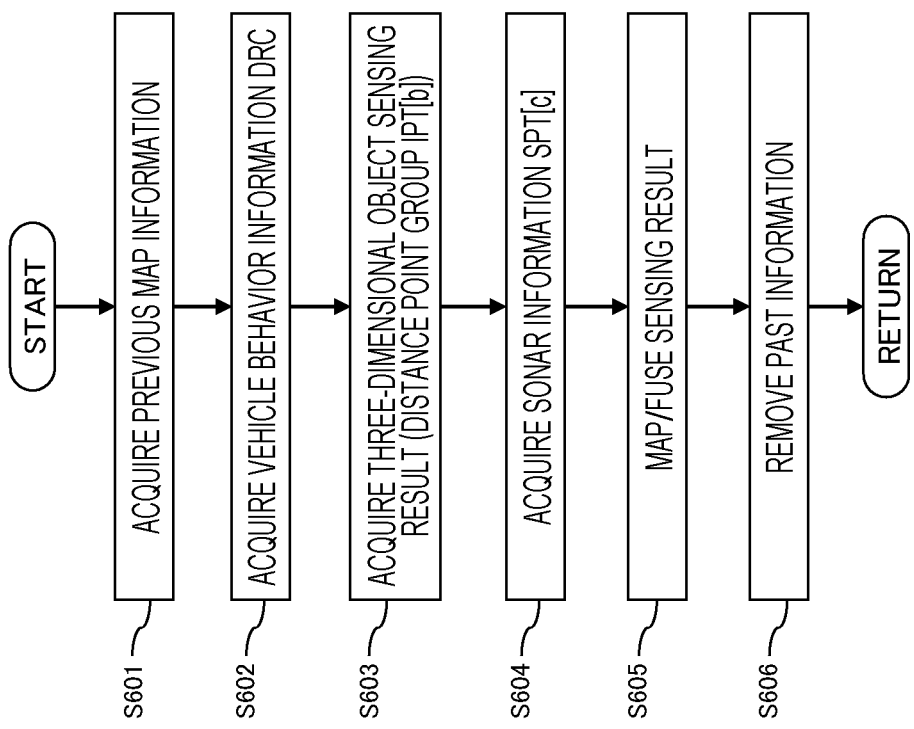
FIG. 6 is a flowchart illustrating a processing performed by a three-dimensional object information storage unit according to the first embodiment.

Next, contents of a processing performed by the three-dimensional object information storage unit 1051 will be described with reference to FIGS. 6 and 7A to 7D. FIG. 6 is a flowchart illustrating a flow of a processing performed by the three-dimensional object information storage unit 1051. FIGS. 7A to 7D are diagrams for describing a processing performed by the three-dimensional object information storage unit 1051.

The three-dimensional object information storage unit 1051 stores the distance point group IPT[b] calculated by the three-dimensional object sensing unit 1031 and the distance point group SPT[c] of the sonar acquired by the three-dimensional object information acquisition unit 1041, including past values thereof.

According to the present embodiment, the three-dimensional object information storage unit 1051 manages all obstacle information with a two-dimensional map EMP which has a certain position as an origin and does not have height information. The three-dimensional object information storage unit 1051 attaches information of the distance point group IPT[b] and the distance point group SPT[c] of the sonar which are sequentially calculated to a blank two-dimensional map by using the vehicle behavior DRC acquired by the vehicle behavior information acquisition unit 1050, thereby creating a two-dimensional map EMP[x][y]. Here, the EMP is a two-dimensional array and x and y are coordinates of the array partitioned with spatial resolution.

First, in step S601, a two-dimensional map EMP which is previously processed is acquired.

Then, in step S602, the vehicle behavior DRC is acquired from the vehicle behavior information acquisition unit 1050.

Then, in step S603, the distance point group IPT[b] calculated by the three-dimensional object sensing unit 1031 is acquired.

Then, in step S604, the distance point group SPT[c] of the sonar acquired by the three-dimensional object information acquisition unit 1041 is acquired.

The acquired distance point group IPT[b] or distance point group SPT[c] has information of relative coordinates to the host vehicle 10. Therefore, in step S605, the distance point group IPT[b] obtained by the camera and the distance point group SPT[c] obtained by the sonar are mapped to a blank map, respectively, by using the vehicle behavior DRC, thereby creating the two-dimensional map EMP.

In addition, in step S606, point group information acquired in the past is eliminated from all three-dimensional object point groups OPT[d] mapped to the two-dimensional map EMP, and a point group remaining in the map is the three-dimensional object point group OPT[d].

Here, a certainty value is set for each grid of the two-dimensional map and it is determined that an obstacle is present only in a grid with a certainty value which is equal to or greater than a predetermined threshold value, such that it is possible to cancel noise of the sensing result.

For example, the three-dimensional object information storage unit 1051 can increase a certainty value when the past information or a plurality of sensing results are simultaneously obtained in the same grid in step S605, and can decrease certainty values of all grids by a predetermined value in step S606. As a result, a certainty value of a grid in which sensing results are duplicated is increased and a certainty value of a grid in which a sensing result cannot be repeatedly obtained is decreased, such that old information is eliminated.

Figure 7A:
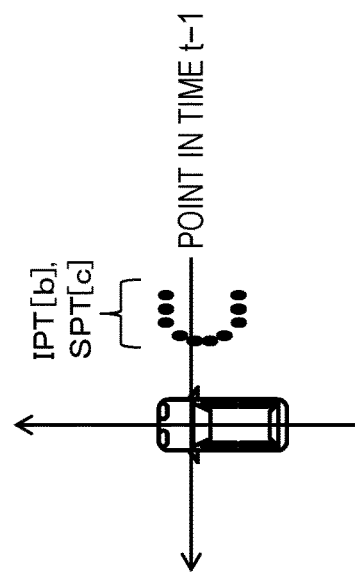
FIG. 7A is a diagram for describing a processing performed by the three-dimensional object information storage unit according to the first embodiment.
Figure 7B:
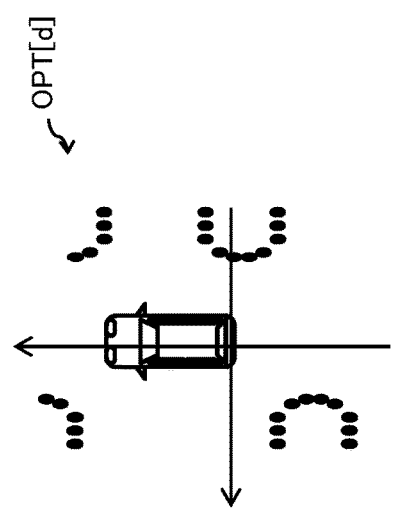
FIG. 7B is a diagram for describing a processing performed by the three-dimensional object information storage unit according to the first embodiment.
Figure 7C:
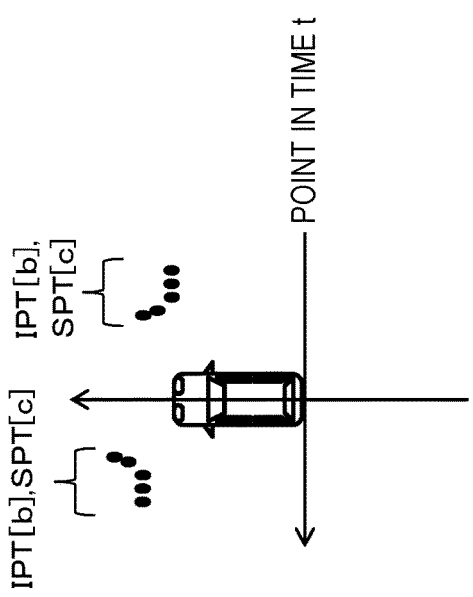
FIG. 7C is a diagram for describing a processing performed by the three-dimensional object information storage unit according to the first embodiment.
Figure 7D:
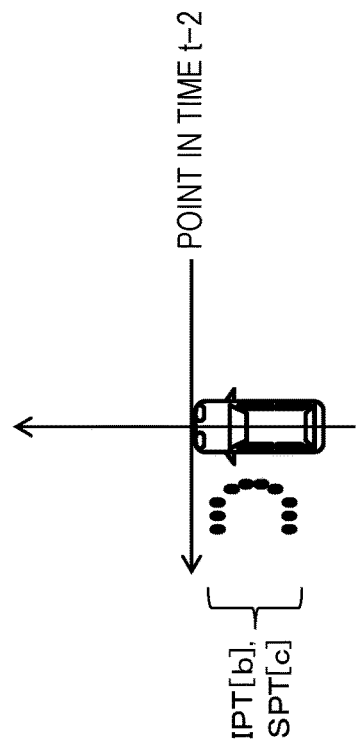
FIG. 7D is a diagram for describing a processing performed by the three-dimensional object information storage unit according to the first embodiment.

FIGS. 7A to 7D illustrate an example of the processing. When distance point groups IPT[b] and SPT[c] obtained at a point in time t are as illustrated in FIG. 7A, distance point groups IPT[b] and SPT[c] obtained at a point in time t-1 are as illustrated in FIG. 7B, and distance point groups IPT[b] and SPT[c] obtained at a point in time t-2 are as illustrated in FIG. 7C, an example of a three-dimensional object point group OPT[d] which is a result of integrating the distance point groups by using the vehicle behaviors DRC at the point in time t, the point in time t-1, and the point in time t-2, respectively, is as illustrated in FIG. 7D.

[White Line Feature Distinguishing Unit 1061]

Figure 8:
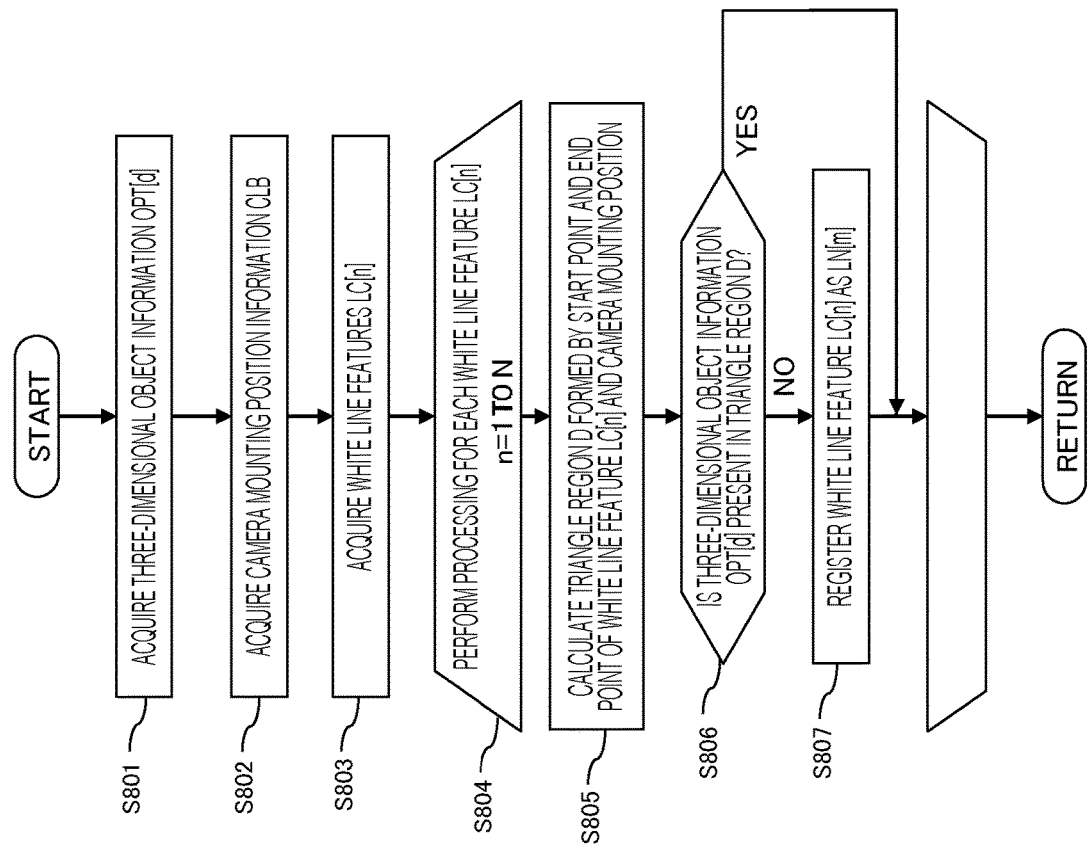
FIG. 8 is a flowchart illustrating a processing performed by a white line feature distinguishing unit according to the first embodiment.

Next, contents of a processing performed by the white line feature distinguishing unit 1061 will be described with reference to FIGS. 8 and 9A to 9F. FIG. 8 is a flowchart illustrating a flow of a processing performed by the white line feature distinguishing unit 1061. FIGS. 9A to 9F are diagrams for describing a processing performed by the white line feature distinguishing unit 1061.

The white line feature distinguishing unit 1061 distinguishes whether the white line feature LC[n] is the white line LN[m] on the road surface or a bumper, a side sill, or a coating of an adjacent parked vehicle which is an object on a three-dimensional object by using the white line feature LC[n] obtained by the white line feature sensing unit 1021, three-dimensional object information OPT[d] obtained by the three-dimensional object information storage unit 1051, and camera mounting position information CLB.

First, in step S801, the three-dimensional object information OPT[d] is acquired.

Then, in step S802, the camera mounting position information CLB is acquired.

Then, in step S803, the white line features LC[n] are acquired.

Then, in step S804, the following series of processing in steps S805 to S807 is performed with respect to n=1 to N for all white line features LC[n] in which n=1 to N.

First, in step S805, a triangle region D in the two-dimensional coordinate system in which a height is not considered is calculated based on three points including a start point coordinate and an end point coordinate of the white line feature LC[n], and a camera mounting position coordinate.

Then, in step S806, whether or not the three-dimensional object information OPT[d] is present in the triangle region D is determined. When it is determined that the three-dimensional object information OPT[d] is not present in the triangle region D, the processing proceeds to step S807, and the white line feature LC[n] is registered as the white line LN[m]. Whereas, when it is determined that the three-dimensional object information OPT[d] is present in the triangle region D, the white line feature LC[n] is not regarded as the white line LN[m] and the next white line feature LC[n] is subjected to the determination processing.

Figure 9A:
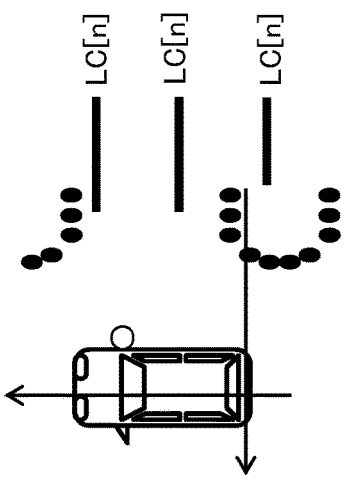
FIG. 9A is a diagram for describing a processing performed by the white line feature distinguishing unit according to the first embodiment.
Figure 9B:
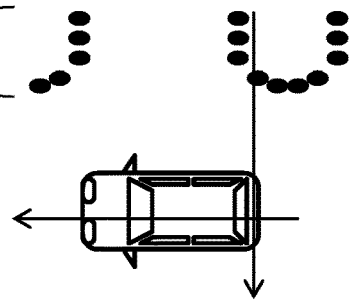
FIG. 9B is a diagram for describing a processing performed by the white line feature distinguishing unit according to the first embodiment.
Figure 9C:
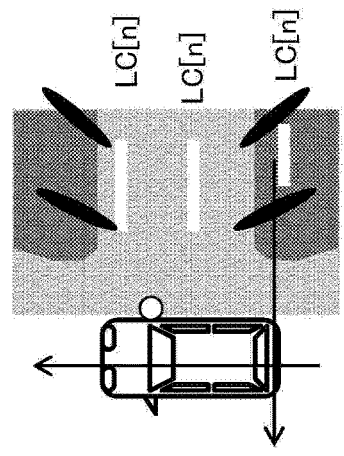
FIG. 9C is a diagram for describing a processing performed by the white line feature distinguishing unit according to the first embodiment.
Figure 9D:
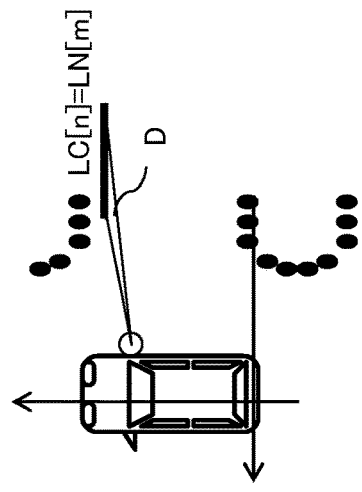
FIG. 9D is a diagram for describing a processing performed by the white line feature distinguishing unit according to the first embodiment.
Figure 9E:
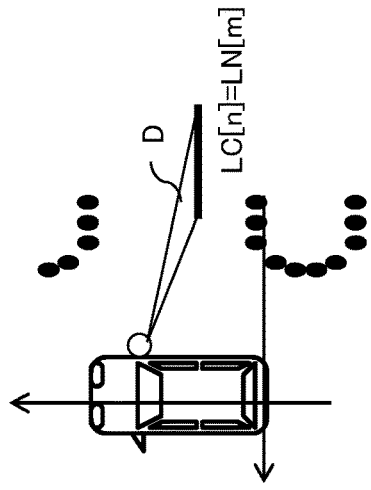
FIG. 9E is a diagram for describing a processing performed by the white line feature distinguishing unit according to the first embodiment.
Figure 9F:
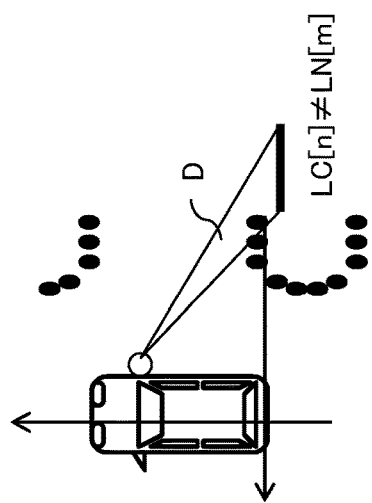
FIG. 9F is a diagram for describing a processing performed by the white line feature distinguishing unit according to the first embodiment.

Examples of a series of the processing in steps S805 to S807 will be described with reference to FIGS. 9A to 9F. Here, three white line features LC[n] will be described. FIG. 9A illustrates a result of sensing white line features LC[n] in the overhead image 1015. FIG. 9B illustrates three-dimensional object information OPT[d], and FIG. 9C illustrates a result in which the three-dimensional object information OPT[d] and the white line features LC[n] are overlapped with each other. FIGS. 9D, 9E, and 9F illustrate a state in which whether or not respective triangle regions D overlap with respective white line features LC[n] is confirmed.

The three-dimensional object information OPT[d] and the white line feature LC[n] are overlapped with each other as illustrated in FIG. 9C by using the white line feature LC[n] as illustrated in FIG. 9A, the camera mounting position information CLB at which the white line feature LC[n] is sensed, and a sensing result of the three-dimensional object information OPT[d] as illustrated in FIG. 9B. Based on FIG. 9C, three triangle regions D illustrated in FIGS. 9D, 9E, and 9F, respectively, are generated, and whether or not the three-dimensional object information OPT[d] is present inside the respective triangle regions D is determined.

In this example, since the three-dimensional object information is present inside the triangle region D generated as illustrated in FIG. 9F, the white line feature LC[n] illustrated in FIG. 9F is eliminated, and the remaining two white line features LC[n] illustrated in FIGS. 9D and 9E, respectively, are registered as white lines LN[m].

[Parking Bay Recognition Unit 1071]

Figure 10:
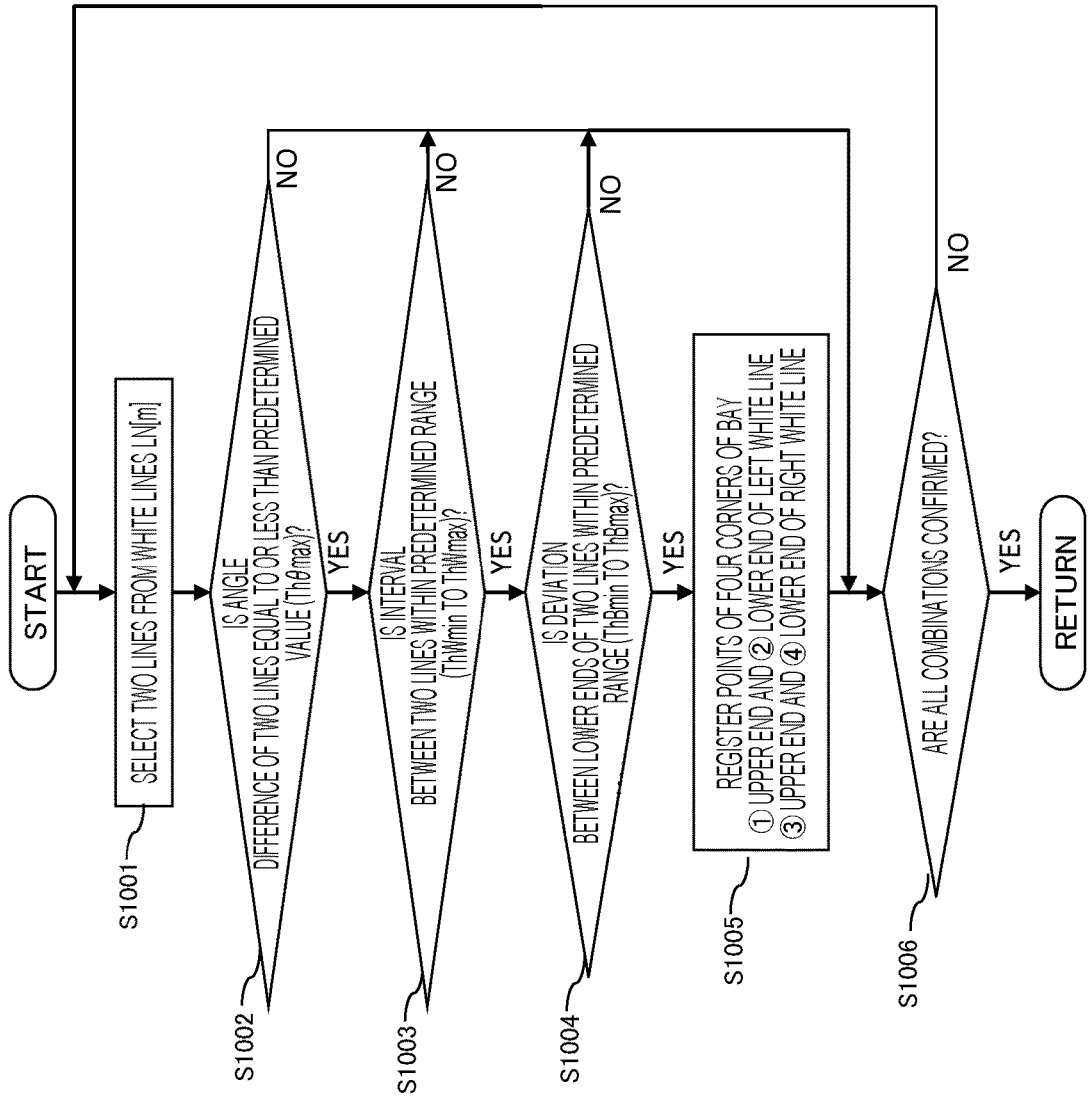
FIG. 10 is a flowchart illustrating a processing performed by a parking bay recognition unit according to the first embodiment.

Next, contents of a processing performed by the parking bay recognition unit 1071 will be described with reference to FIG. 10. FIG. 10 is a flowchart illustrating a flow of a processing performed by the parking bay recognition unit 1071.

The parking bay recognition unit 1071 searches and recognizes a parking bay within which the host vehicle 10 can be parked by combining registered white lines LN[m].

First, in step S1001, two lines LN[mL] and LN[mR] are selected from the white lines LN[m].

Then, in step S1002, whether or not an angle difference el in an extending direction of the two white lines LN[mL] and LN[mR] selected in step S1001 is equal to or less than a predetermined value (Thθmax) is determined. In other words, whether or not the two white lines are approximately in parallel to each other is determined in step S1002. When it is determined that the angle difference el is equal to or less than the predetermined value, the processing proceeds to step S1003, and when it is determined that the angle difference el is greater than the predetermined value, it is determined that the selected two white lines LN[mL] and LN[mR] do not correspond to a combination of white lines constituting a parking bay and thus the processing proceeds to step S1006.

When the determination is affirmative in step S1002, the processing proceeds to step S1003, and whether or not an interval W between the two white lines LN[mL] and LN[mR] is within a predetermined range (ThWmin or greater and ThWmax or less) is determined. That is, in step S1003, whether or not the two white lines are arranged at an interval at which the two white lines can be considered as two white lines constituting a parking bay. When it is determined that the interval W is within the predetermined range, the processing proceeds to step S1004, and when it is determined that the interval W is not within the predetermined range, the processing proceeds to step S1006.

When the determination is affirmative in step S1003, the processing proceeds to step S1004, and whether or not a misalignment degree AB between lower ends of the two white lines is within a predetermined range (ThBmin or greater and ThBmax or less) is determined. Here, the misalignment degree between the lower ends of the two white lines determined in step S1004 will be described with reference to FIGS. 11A and 11B.

Figure 11A:
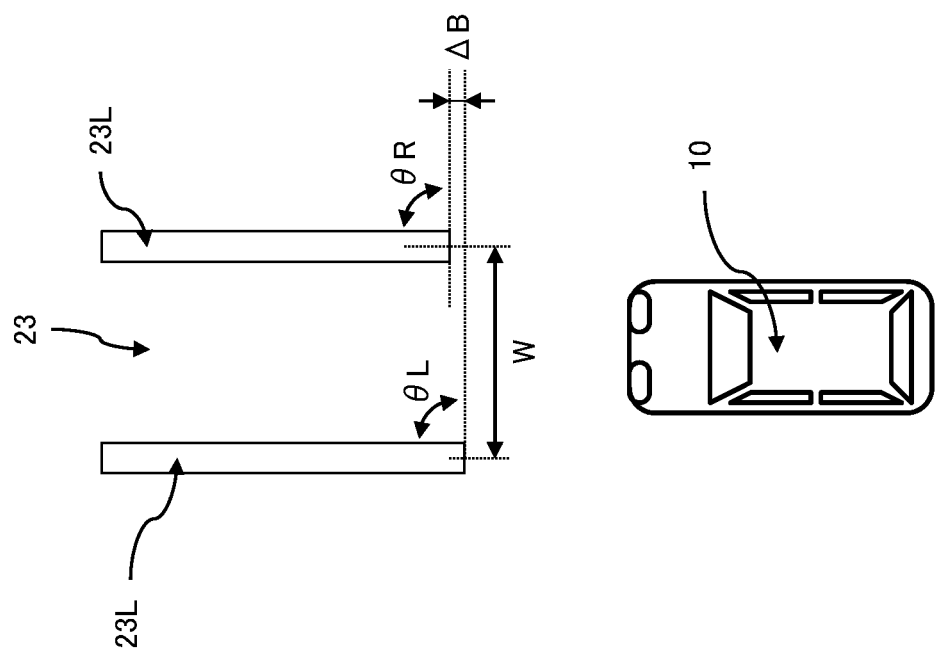
FIG. 11A is a diagram for describing a processing performed by the parking bay recognition unit according to the first embodiment.

As illustrated in FIG. 11A, in a case where a parking bay 23 is provided in a space of a parking lot so that the host vehicle 10 is parked in parallel to or perpendicularly to a movement direction (a top-bottom direction and a left-right direction in FIG. 11A) of the host vehicle 10, and parking bay lines 23L are drawn to correspond to the parking bay 23, lower ends of the parking bay lines 23L are not misaligned with each other.

Figure 11B:
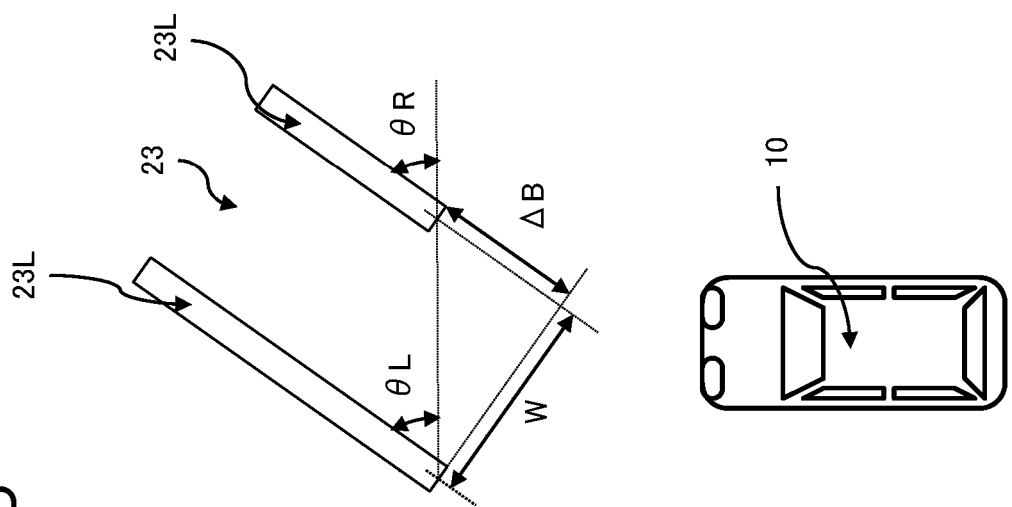
FIG. 11B is a diagram for describing a processing performed by the parking bay recognition unit according to the first embodiment.

However, as illustrated in FIG. 11B, depending on a parking lot, a parking bay 23 is provided so that the host vehicle 10 is parked obliquely with respect to a movement direction (a top-bottom direction and a left-right direction in FIG. 11B) of the host vehicle 10, rather than being parked in parallel to or perpendicularly to the movement direction of the host vehicle 10, and parking bay lines 23L are drawn to correspond to the parking bay 23 in some cases. In this case, lower end positions of the parking bay lines 23L constituting the parking bay 23 are misaligned with each other as indicated by a distance B. The lower end positions of the parking bay line 23L are misaligned with each other in order to prevent the parking bay line 23L on the right side of FIG. 11B from protruding to a region in which the host vehicle 10 travels.

For example, an intersection angle ρ between a line segment, which is perpendicular to an extending direction of the parking bay line 23L on the left side of FIG. 11B, extending from the lower end of the parking bay line 23L and a line segment connecting the lower ends of the parking bay lines 23L to each other is fixed to be any one of 0 degrees, 30 degrees, and 45 degrees in an expressway service area or a parking area. In addition, a range of a value which can be obtained as a width W of the parking bay 23 is already determined. Therefore, according to the present embodiment, a value of the distance B which can be obtained when the intersection angle θ is any one of 0 degrees, 30 degrees, and 45 degrees is stored in a memory (not illustrated) or the like in advance.

In step S1004, distances B calculated based on the selected LN[mL] and LN[mR] are compared with each other and whether a difference between the distances B is within a predetermined range (ThBmin or greater and ThBmax or less) is determined, such that whether or not the two white lines are white lines (parking bay lines 23L) constituting one parking bay 23 is determined. When it is determined that the difference is within the predetermined range, the processing proceeds to step S1005, and when it is determined that the difference is not within the predetermined range, the processing proceeds to step S1006.

When the determination is affirmative in step S1004, the processing proceeds to step S1005, and coordinates of four corners of a rectangular parking bay 23 constituted by the two white lines LN[mL] and LN[mR] are registered as position information PS[k] on a position of one parking bay 23.

When step S1005 is performed, the processing proceeds to step S1006, and whether or not the processing for any two white lines described above is performed for all white lines (parking bay line) based on the information output from the white line feature distinguishing unit 1061 is confirmed. When the determination is affirmative in step S1006, a result obtained by the processing described above is output and the processing performed by the parking bay recognition unit 1071 ends. When the determination is negative in step S1006, the processing returns to step S1001, and the processing described above is performed for all combinations of the white lines LN[m].

Next, an effect of the present embodiment will be described.

As described above, when sensing a white line by using a camera image, whether a feature is present on a three-dimensional object or present on a road surface is not distinguished only from the camera image. Therefore, if all features are assumed as being present on the road surface and world coordinates thereof are measured, a feature, which is present on a three-dimensional object, is measured as being present further away than it is. Accordingly, in the vehicle-mounted image processing device 1000 according to the first embodiment of the present invention described above, white line features of a parking bay are sensed, a processing of overlapping acquired three-dimensional object information with a triangle constituted by a start point and an end point obtained based on the white line feature and a camera mounting position is performed, whether a feature having a feature amount of a target object is present on a three-dimensional object or present on a road surface is determined, and the target object is recognized by using the feature having the feature amount on the road surface.

By this processing, in a case of a white line feature which is present on a three-dimensional object, three-dimensional object information is positioned within the triangle. On the contrary, in a case of a feature which is present on a road surface, there is no three-dimensional object positioned within the triangle. By using this characteristic, it is possible to distinguish only a white line feature, which is present on a road surface, among white line features and to recognize a parking bay. As a result, in a system assisting in a parking operation, it is possible to avoid misrecognition of apart of a three-dimensional object as a parking bay and prevent a situation in which a target parking position is misrecognized as a part of a three-dimensional object and thus the vehicle moves toward the three-dimensional object and collides with the three-dimensional object.

[Modified Example of Three-Dimensional Object Acquisition Unit According to First Embodiment]

Hereinafter, a plurality of modified examples of acquisition of three-dimensional object information according to the first embodiment will be described.

Figure 12:
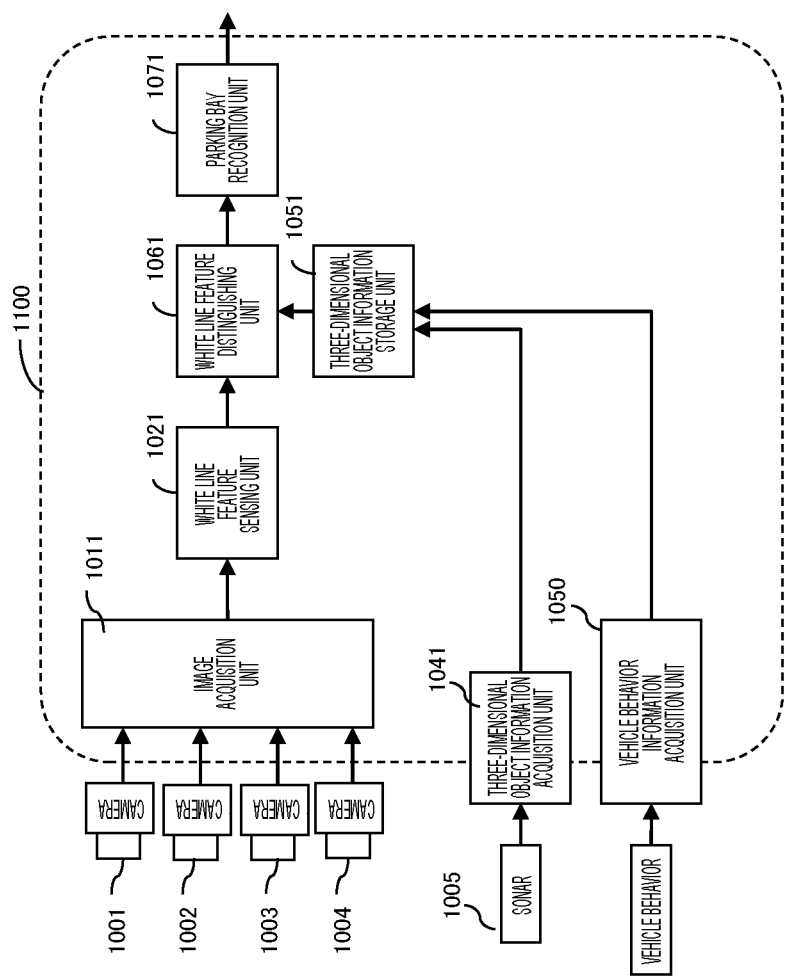
FIG. 12 is a block diagram of a first modified example of the first embodiment.

FIG. 12 is a block diagram of a vehicle-mounted image processing device 1100 of a first modified example according to the present embodiment. The vehicle-mounted image processing device 1100 illustrated in FIG. 12 is an example in which the vehicle-mounted image processing device 1000 illustrated in FIG. 1 does not include the three-dimensional object sensing unit 1031. In this case, the three-dimensional object information storage unit 1051 performs a processing only with a result which is obtained by the three-dimensional object information acquisition unit 1041. In other words, step S603 in FIG. 6 is not performed. Other configurations and processing are the same as the configurations and the processing of each unit according to the first embodiment.

Figure 13:
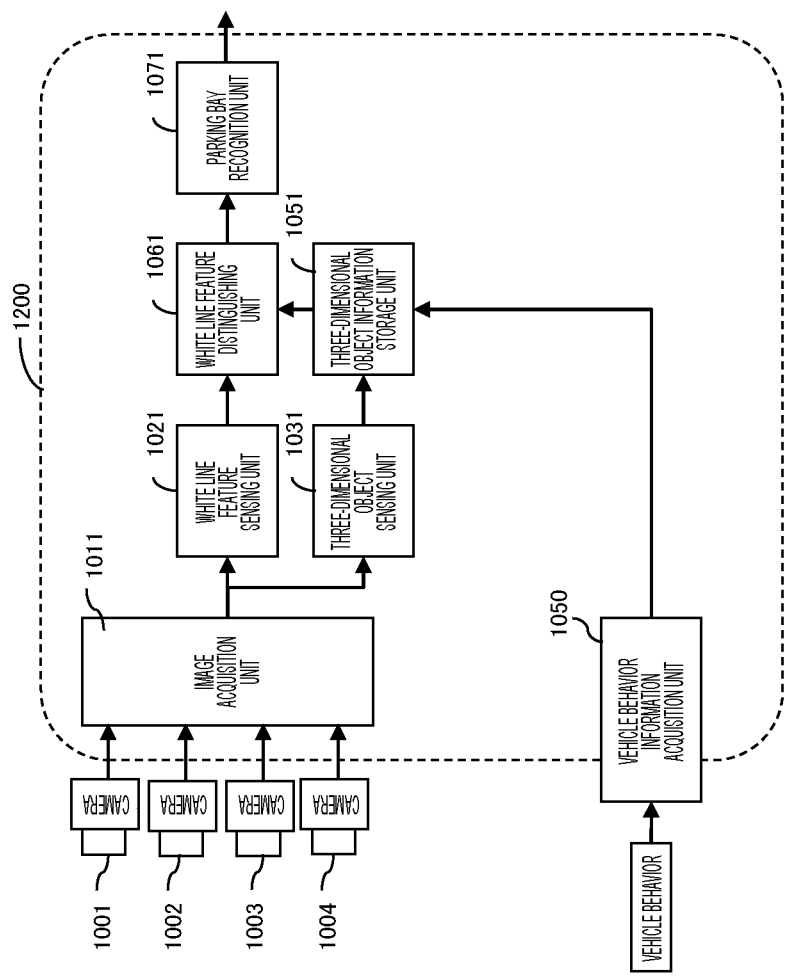
FIG. 13 is a block diagram of a second modified example of the first embodiment.

FIG. 13 is a block diagram of a vehicle-mounted image processing device 1200 of a second modified example according to the present embodiment. The vehicle-mounted image processing device 1200 illustrated in FIG. 13 is an example in which the vehicle-mounted image processing device 1000 illustrated in FIG. 1 does not include the three-dimensional object information acquisition unit 1041. In this case, the three-dimensional object information storage unit 1051 performs a processing only with a result which is obtained by the three-dimensional object sensing unit 1031. In other words, step S604 in FIG. 6 is not performed. Other configurations and processing are the same as the configurations and the processing of each unit according to the first embodiment.

Figure 14:
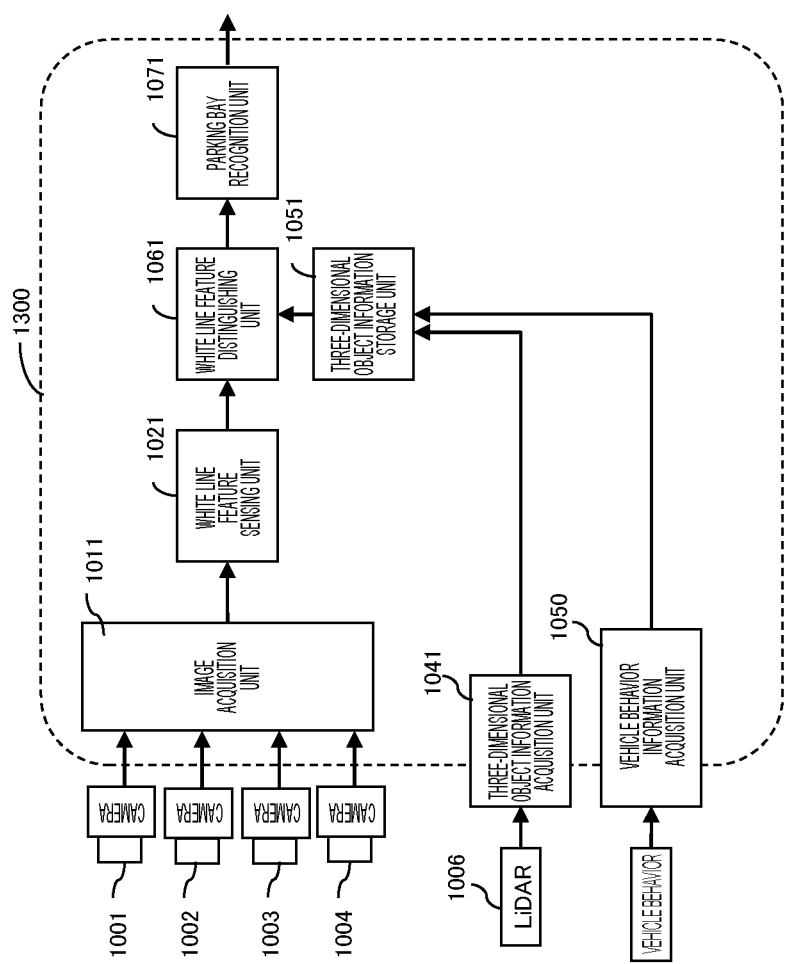
FIG. 14 is a block diagram of a third modified example of the first embodiment.

FIG. 14 is a block diagram of a vehicle-mounted image processing device 1300 of a third modified example according to the present embodiment. The vehicle-mounted image processing device 1300 illustrated in FIG. 14 is an example in which the vehicle-mounted image processing device 1000 illustrated in FIG. 1 includes a LiDAR (light detection and ranging or laser imaging detection and ranging) 1006, and the three-dimensional object information acquisition unit 1041 acquires information obtained by the LiDAR 1006. The LiDAR is a device which measures scattered light with respect to laser irradiation in the form of pulses and analyzes a distance to an object which is positioned far away or a property of the object. The LiDAR 1006 can detect a three-dimensional object, and thus the three-dimensional object sensing unit 1031 is not necessary. Other configurations and processing are the same as the configurations and the processing of the first modified example according to the first embodiment illustrated in FIG. 12.

Second Embodiment

Figure 15:
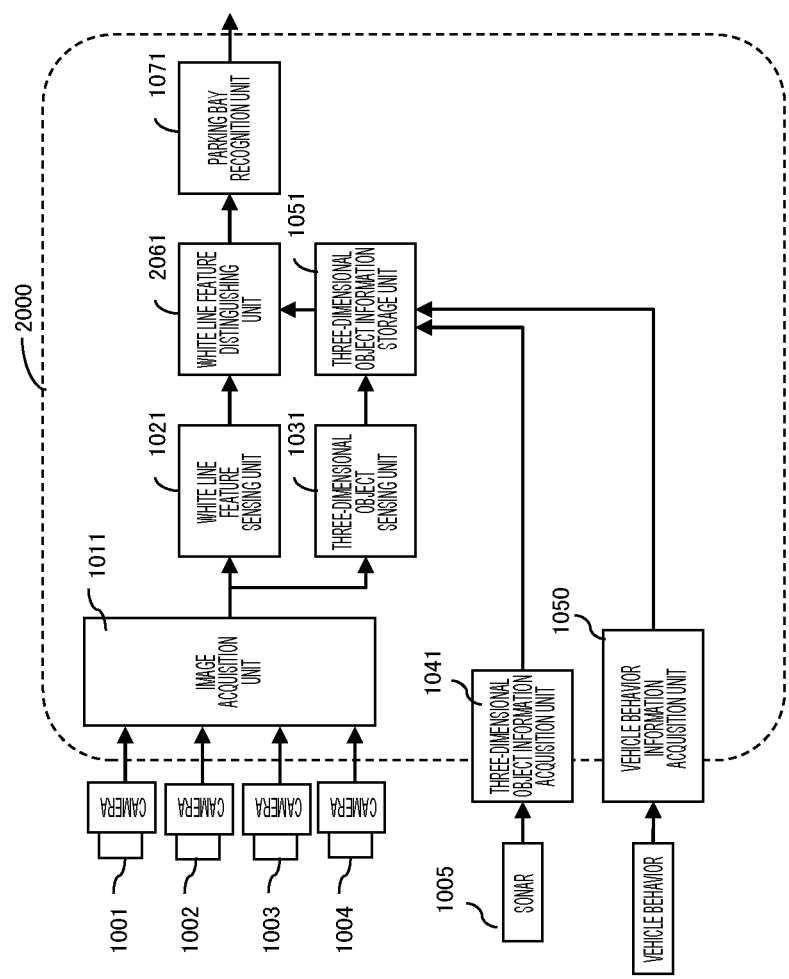
FIG. 15 is a block diagram of a vehicle-mounted image processing device according to a second embodiment of the present invention.

A vehicle-mounted image processing device according to a second embodiment of the present invention will be described with reference to FIGS. 15 to 17E. FIG. 15 is a block diagram illustrating a configuration of a vehicle-mounted image processing device 2000 according to the second embodiment.

In the following description, only differences from the vehicle-mounted image processing device 1000 according to the first embodiment will be described in detail, and the same component is denoted by the same reference numeral and a detailed description thereof will be omitted. The same applies to the following embodiments.

As illustrated in FIG. 15, the vehicle-mounted image processing device 2000 is different from the vehicle-mounted image processing device 1000 according to the first embodiment in regard to the fact that the vehicle-mounted image processing device 2000 includes a white line feature distinguishing unit (feature amount distinguishing unit) 2061 instead of the white line feature distinguishing unit 1061.

The vehicle-mounted image processing device 2000 is a device which is embedded in a camera device mounted on a vehicle, an integrated controller, or the like, and senses an object in an image captured by cameras 1001 to 1004. The vehicle-mounted image processing device 2000 according to the present embodiment is configured to sense a parking bay as a target object.

The vehicle-mounted image processing device 2000 is constituted by a computer including a central processing unit (CPU), a memory, an I/O, and the like. A predetermined processing is programmed and is repeatedly performed in a predetermined cycle.

[White Line Feature Distinguishing Unit 2061]

Figure 16:
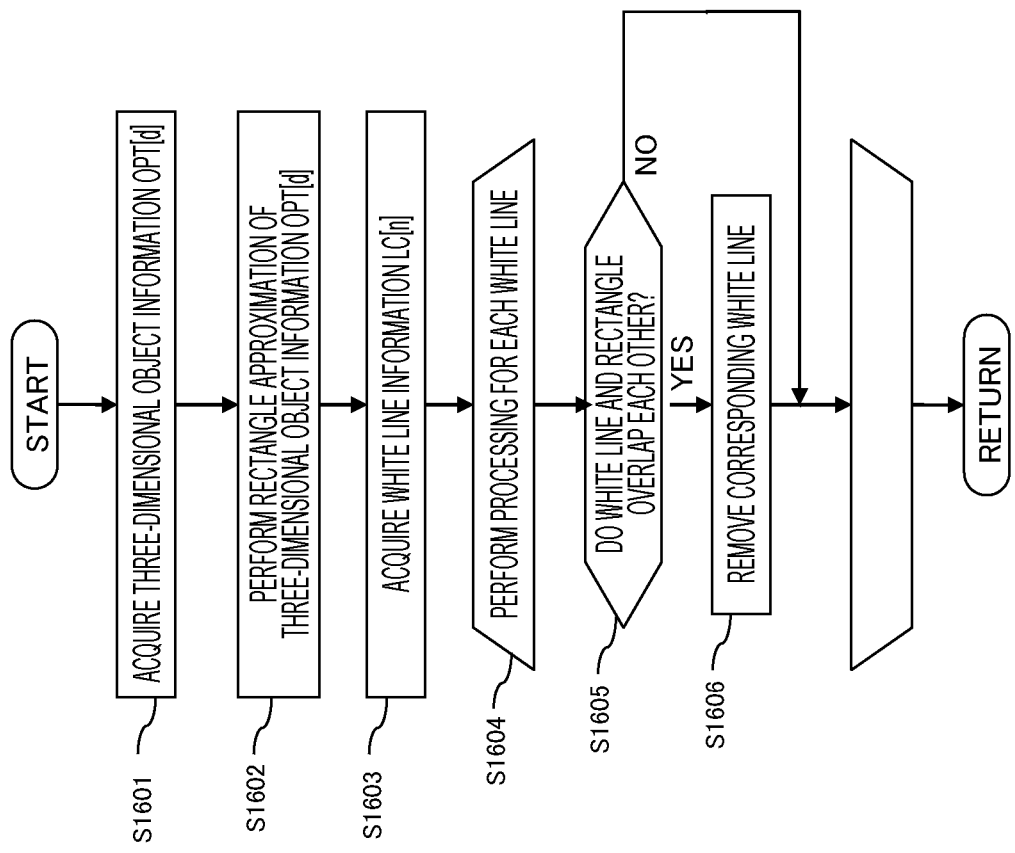
FIG. 16 is a flowchart illustrating a processing performed by a white line feature distinguishing unit according to the second embodiment.

Contents of a processing performed by the white line feature distinguishing unit 2061 will be described with reference to FIGS. 16 and 17A to 17E. FIG. 16 is a flowchart illustrating a flow of a processing performed by the white line feature distinguishing unit 2061. FIGS. 17A to 17E are diagrams for describing a processing performed by the white line feature distinguishing unit 2061.

The white line feature distinguishing unit 2061 distinguishes whether or not a white line feature LC[n] is a white line LN[m] on a road surface by using the white line feature LC[n] obtained by a white line feature sensing unit 1021 and three-dimensional object information OPT[d] obtained by a three-dimensional object information storage unit 1051, without using camera mounting position information CLB.

First, in step S1601, the three-dimensional object information OPT[d] is acquired.

Then, in step S1602, a rectangle with a predetermined size is fitted to a point group of the three-dimensional object information OPT[d], and the rectangle of which a degree of fitting is equal to or greater than a predetermined value is stored as an approximating rectangle RCT[f]. There is a known method for performing rectangle approximation for a point group, and thus a detailed description thereof will be omitted. As the predetermined size, for example, a size of the host vehicle is used.

Then, in step S1603, the white line features LC[n] are acquired.

Then, in step S1604, a series of processing in steps S1605 and S1606 is performed with respect to n=1 to N for all white line features LC[n] in which n=1 to N.

First, in step S1605, whether or not apart of the white line feature LC[n] is present inside any rectangle RCT[ f] is determined. When it is determined that the white line feature LC[n] is not present inside the rectangle RCT[f] and does not overlap with the rectangle, the processing proceeds to step S1606, and the white line feature LC[n] is registered as a white line LN[m]. Whereas, when it is determined that the white line feature LC[n] is at least partially present inside the rectangle RCT[f] and overlaps with the rectangle, the white line feature LC[n] is not regarded as the white line LN[m] and the next white line feature LC[n] is subjected to the processing.

Figure 17A:
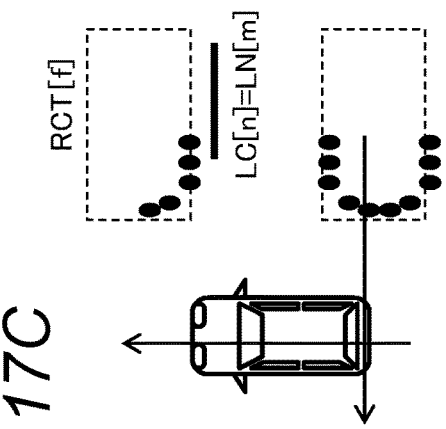
FIG. 17A is a diagram for describing a processing performed by the white line feature distinguishing unit according to the second embodiment.
Figure 17B:
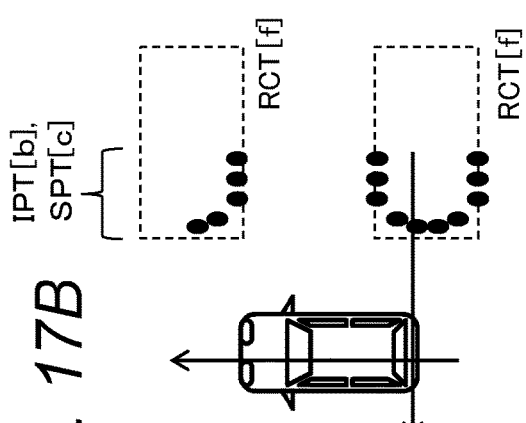
FIG. 17B is a diagram for describing a processing performed by the white line feature distinguishing unit according to the second embodiment.
Figure 17C:
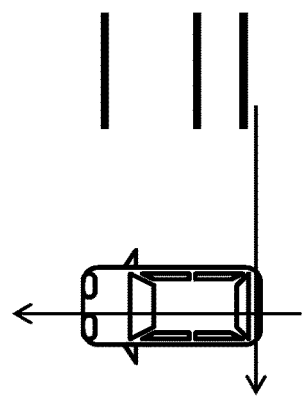
FIG. 17C is a diagram for describing a processing performed by the white line feature distinguishing unit according to the second embodiment.
Figure 17D:
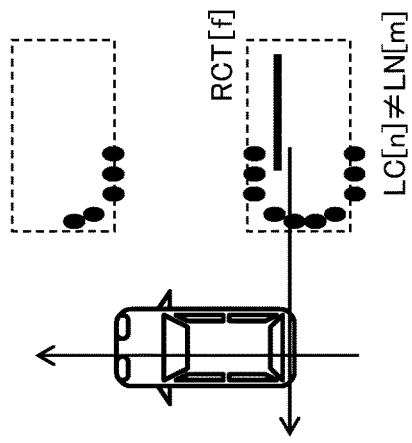
FIG. 17D is a diagram for describing a processing performed by the white line feature distinguishing unit according to the second embodiment.
Figure 17E:
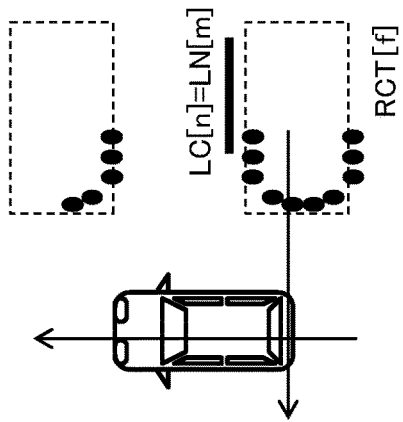
FIG. 17E is a diagram for describing a processing performed by the white line feature distinguishing unit according to the second embodiment.

Examples of a series of the processing in steps S1605 and S1606 will be described with reference to FIGS. 17A to 17E. Here, three white line features LC[n] will be described. FIG. 17A illustrates a result of sensing white line features LC[n]

from an overhead image. FIG. 17B illustrates a result with three-dimensional object information OPT[d] and an approximating rectangle RCT[f]. FIGS. 17C, 17D, and 17E are diagrams illustrating a state in which whether or not respective approximating rectangles RCT[f] overlap with respective white line features LC[n] is confirmed.

An approximating rectangle RCT[f] illustrated in FIG. 17B is overlapped with a white line feature LC[n] illustrated in FIG. 17A and whether or not the white line feature LC[n] is at least partially present inside the approximating rectangle RCT[f] is determined.

In this example, since a white line feature LC[n] in FIG. 17E is present in the rectangle, the white line feature LC[n] in FIG. 17E is eliminated, and the remaining two white line features LC[n] illustrated in FIGS. 17C and 17D, respectively, are registered as white lines LN[m].

Other configurations and operations are approximately the same as the configurations and the operations of the vehicle-mounted image processing device 1000 according to the first embodiment, and thus a detailed description thereof will be omitted.

As described above, it is highly likely that an obstacle in parking bay recognition in a parking lot is a parked vehicle. Therefore, the vehicle-mounted image processing device 2000 according to the second embodiment fits a rectangle having a size corresponding to a vehicle, for example, a rectangle having a size of the host vehicle, to the three-dimensional object information. By this processing, it is possible to predict a position of an obstacle outside a sensing range and determine whether a white line feature is a feature on a three-dimensional object or a feature on a road surface by using the approximating rectangle. Therefore, almost the same effect as the effect of the vehicle-mounted image processing device 1000 according to first embodiment described above is obtained.

Third Embodiment

Figure 18:
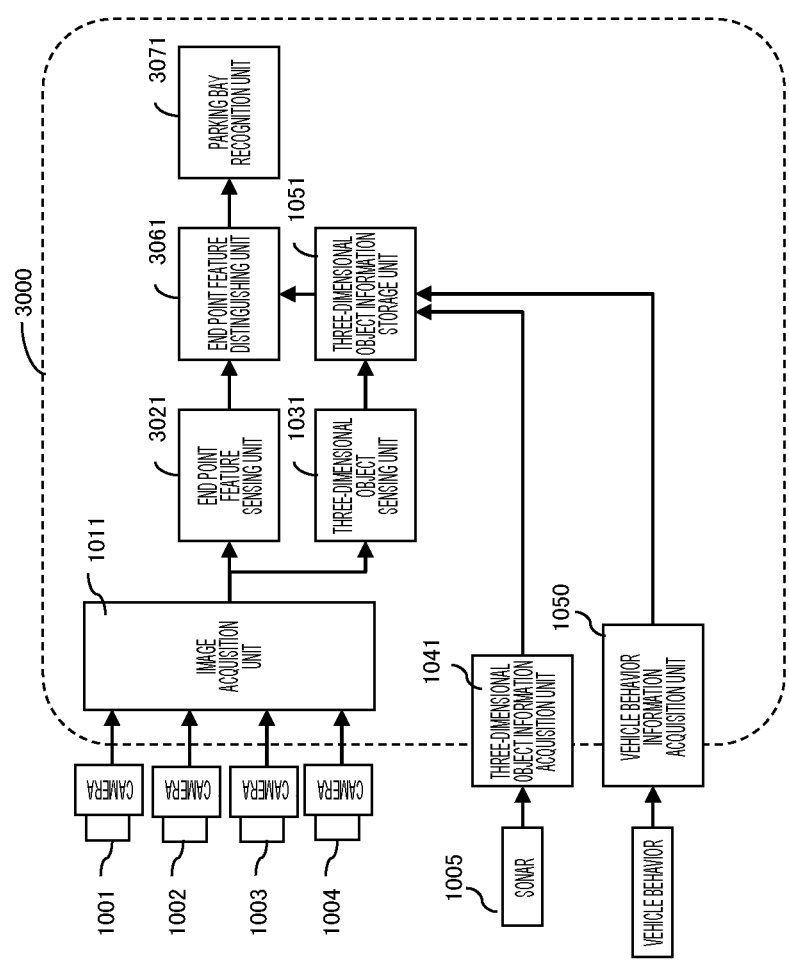
FIG. 18 is a block diagram of a vehicle-mounted image processing device according to a third embodiment of the present invention.

A vehicle-mounted image processing device according to a third embodiment of the present invention will be described with reference to FIGS. 18 to 23. FIG. 18 is a block diagram illustrating a configuration of a vehicle-mounted image processing device 3000 according to the third embodiment.

As illustrated in FIG. 18, the vehicle-mounted image processing device 3000 according to the present embodiment includes an endpoint feature sensing unit (feature amount extraction unit) 3021, an end point feature distinguishing unit (feature amount distinguishing unit) 3061, and a parking bay recognition unit (target object recognition unit) 3071, instead of the configuration of the vehicle-mounted image processing device 1000 according to the first embodiment for the white line feature sensing.

The vehicle-mounted image processing device 3000 is a device which is embedded in a camera device mounted on a vehicle, an integrated controller, or the like, and senses an object in an image captured by cameras 1001 to 1004, and the vehicle-mounted image processing device 3000 according to the present embodiment is configured to sense a parking bay as a target object.

The vehicle-mounted image processing device 3000 is constituted by a computer including a central processing unit (CPU), a memory, an I/O, and the like. A predetermined processing is programmed and is repeatedly performed in a predetermined cycle.

[End Point Feature Sensing Unit 3021]

Figure 20A:
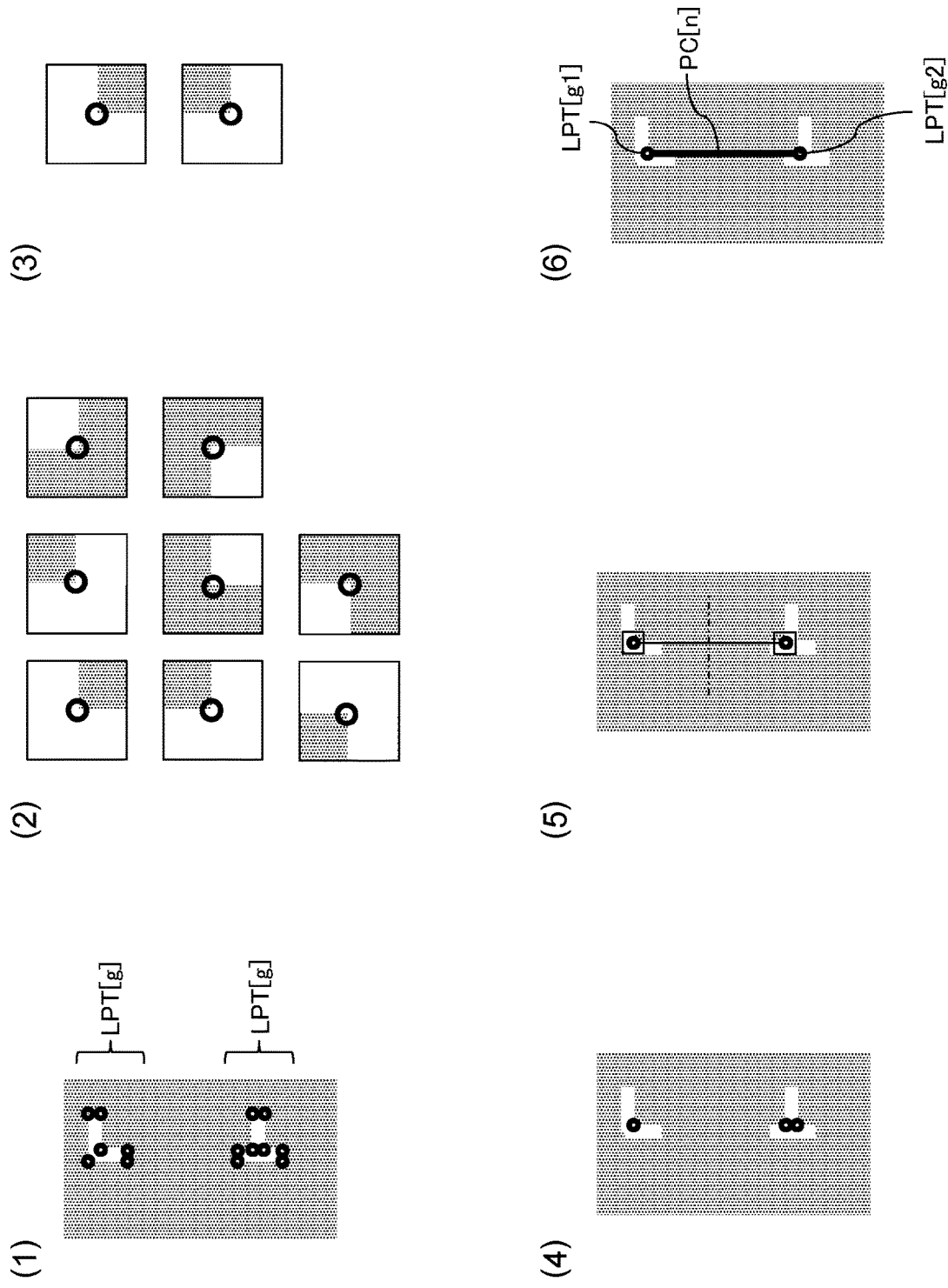
FIG. 20A is a diagram for describing a processing performed by the end point feature sensing unit according to the third embodiment.
Figure 20B:
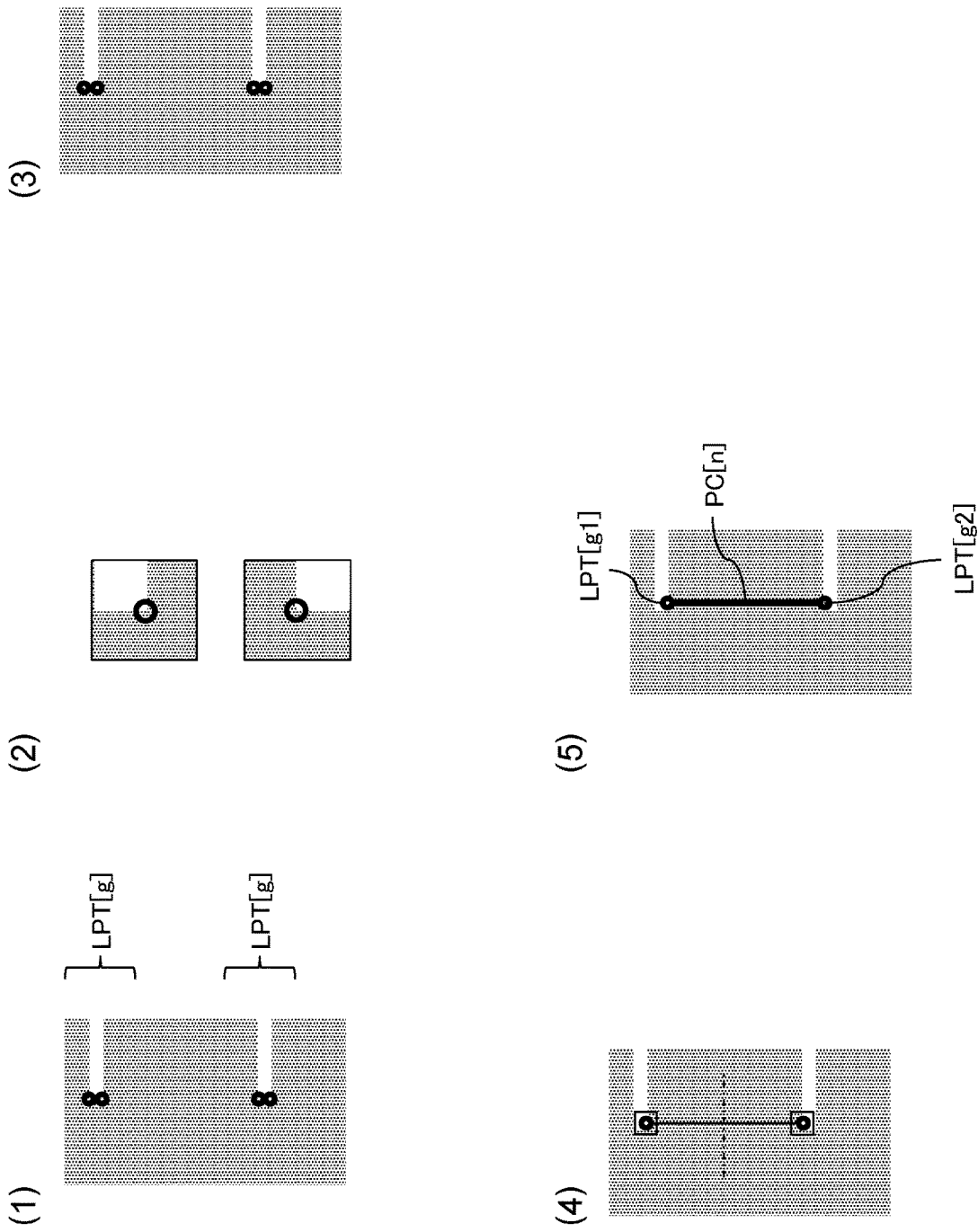
FIG. 20B is a diagram for describing a processing performed by the end point feature sensing unit according to the third embodiment.

Contents of a processing performed by the end point feature sensing unit 3021 will be described with reference to FIGS. 19 to 20B. FIG. 19 is a flowchart illustrating a flow of a processing performed by the end point feature sensing unit 3021. FIGS. 20A and 20B are diagrams for describing a processing performed by the end point feature sensing unit 3021.

The end point feature sensing unit 3021 performs a processing of sensing end points in a current image IMG_C acquired by an image acquisition unit 1011 and sensing end point features PC[n] by using a combination of the end points.

First, in step S1901, an overhead image 1015 acquired by the image acquisition unit 1011 is acquired.

Then, in step S1902, feature points LPT[g] are sensed. In the present embodiment, Harris feature points are sensed. (1) in FIG. 20A and (1) in FIG. 20B illustrate an example in which feature points LPT[g] are sensed.

Then, in step S1903, a surrounding pattern of a feature point LPT[g] is acquired. The end point feature sensing unit 3021 acquires a local pattern LPTN[g] from an image having a predetermined pixel of width and a predetermined pixel of height with the feature point as the center. The acquired pattern may be the image as it is, binarized information, or one which stores a rising angle and a falling angle of an edge. Examples of the acquired surrounding pattern are illustrated in (2) in FIG. 20A.

Then, in steps S1904 and S1905, a calculation is performed for the sensed feature points LPT[g], in which g1=1, ..., G, and g2=g1+1, ..., G, and the following series of processing of steps S1906 to S1908 is performed for all combinations of LPT[g1] and LPT[g2].

First, in step S1906, whether or not the local patterns LPTN[g1] and LPTN[g2] each have a certain pattern shape is determined. The certain pattern is a pattern in which an angle of a parking bay desired to be sensed is defined. For example, the certain pattern is a pattern shape as illustrated in (3) in FIG. 20A or (2) in FIG. 20B (4) in FIG. 20A and (3) in FIG. 20B illustrate a result which is obtained by the determination based on (1) in FIG. 20A and (1) in FIG. 20B, respectively, and in which only LPT[g] with the certain pattern remains. Here, in a case where the local patterns LPTN[g1] and LPTN[g2] satisfy the condition, the processing proceeds to step S1907, and in a case where the local patterns LPTN[g1] and LPTN[g2] do not satisfy the condition, a subsequent processing is not performed and a loop processing is continuously performed while incrementing g1 and g2.

Then, in step S1907, the local patterns LPTN[g1] and LPTN[g2] are compared in regard to symmetry. The comparison is performed by, for example, generating a pattern LPTN' [g2] obtained by reversing the local pattern LPTN [g2] with a vertical line orthogonal to a line segment connecting two selected points as a symmetry axis and calculating a sameness between LPTN[g1] and LPTN'[g2]. (5) in FIG. 20A and (4) in FIG. 20B illustrate examples of the calculation. Then, whether or not a sameness between the local patterns LPTN[g1] and LPTN[g2] is equal to or greater than a predetermined threshold value is determined, and in a case where the sameness is equal to or greater than the predetermined threshold value, the processing proceeds to step S1908, and in a case where the sameness is not equal to or greater than the predetermined threshold value, a subsequent processing is not performed and a loop processing is continuously performed while incrementing g1 and g2.

Then, in step S1908, a line segment including LPT[g1] and LPT[g2] is registered as an end point feature PC[n]. (6) in FIG. 20A and (5) in FIG. 20B are examples of the line segment PC[n] registered as a result of the processing described above.

[End Point Feature Distinguishing Unit 3061]

Next, contents of a processing performed by the end point feature distinguishing unit 3061 will be described with reference to FIGS. 21A to 21D. FIGS. 21A to 21D are diagrams for describing a processing performed by the endpoint feature distinguishing unit 3061.

The end point feature distinguishing unit 3061 distinguishes whether or not an endpoint feature PC[n] is an endpoint line segment PN[m] on a road surface by using the endpoint feature PC[n] obtained by the end point feature sensing unit 3021, three-dimensional object information OPT[d] obtained by a three-dimensional object information storage unit 1051, and camera mounting position information CLB.

A flow of the processing performed by the end point feature distinguishing unit 3061 is the same as the processing performed by the white line feature distinguishing unit 1061 described in FIG. 8, except that an input is changed from the white line feature LC[n] to the end point feature PC[n] and an output is changed from the white line LN[m] to the end point line segment PN[m], and thus a description thereof will be omitted.

Figure 21B:
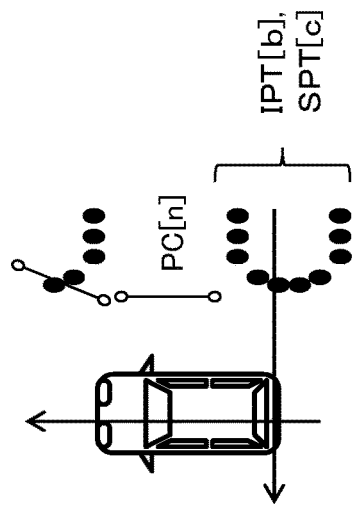
FIG. 21B is a diagram for describing a processing performed by the end point feature distinguishing unit according to the third embodiment.
Figure 21D:
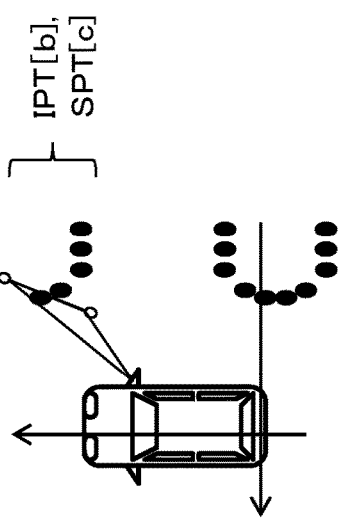
FIG. 21D is a diagram for describing a processing performed by the end point feature distinguishing unit according to the third embodiment.
Figure 21A:
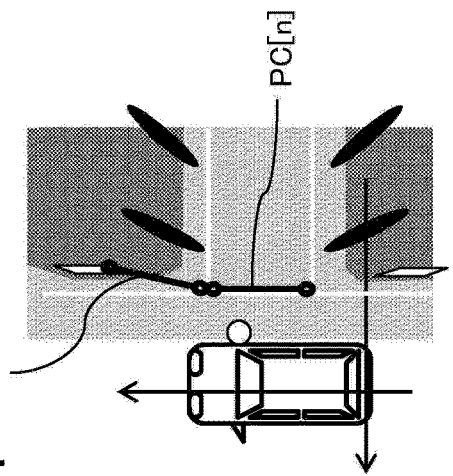
FIG. 21A is a diagram for describing a processing performed by an end point feature distinguishing unit according to the third embodiment.
Figure 21C:
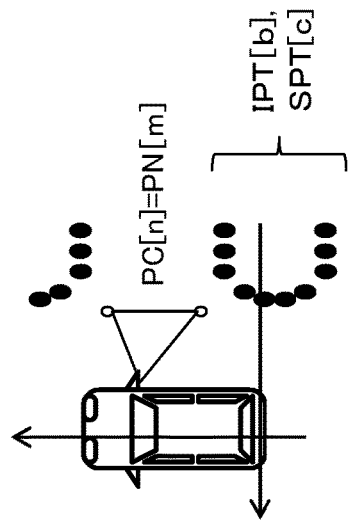
FIG. 21C is a diagram for describing a processing performed by the end point feature distinguishing unit according to the third embodiment.

An example of the processing performed by the end point feature distinguishing unit 3061 will be described with reference to FIGS. 21A to 21D. First, FIG. 21A is an example in which end point features PC[n] are sensed, and two end point features PC[n] are sensed. FIG. 21B is an example in which the end point features PC[n] and the three-dimensional object information OPT[d] are overlapped. FIGS. 21C and 21D illustrate a state in which whether or not respective end point features PC[n] overlap with respective three-dimensional object information OPT[d] is confirmed.

In the processing performed by the end point feature distinguishing unit 3061, a triangle is generated by the two end point features PC[n] and the camera mounting position information CLB as illustrated in FIGS. 21C and 21D, respectively, and whether or not the three-dimensional object information OPT[d] is present inside the triangle is confirmed. Here, the end point features PC[n] illustrated in FIG. 21C are not within the triangle and the end point features PC[n] illustrated in FIG. 21D are within the triangle. Therefore, the endpoint features PC[n] in FIG. 21C are registered as an endpoint line segment PN[m] on the road surface.

[Parking Bay Recognition Unit 3071]

Next, contents of a processing performed by the parking bay recognition unit 3071 will be described with reference to FIGS. 22 and 23. FIG. 22 is a flowchart illustrating a flow of a processing performed by the parking bay recognition unit 3071.

The parking bay recognition unit 3071 searches and recognizes a parking bay within which the host vehicle 10 can be parked by combining registered end point line segments PN[m].

First, in step S2201, one end point line segment PN[m] is selected.

Then, in step S2202, a standard azimuth BB is acquired. Here, as the standard azimuth 613, various azimuths can be used. For example, an azimuth of the host vehicle may be used, and a bearing of a trajectory on which the host vehicle travels for a predetermined time may also be used. In addition, an average bearing of a short side of a past sensing result of a parking bay may be used, and an average value of a short side of the rectangle fitted to the obstacle OPT[d] in the processing performed by the white line feature distinguishing unit 2061 according to the second embodiment may also be used.

Then, in step S2203, whether or not an angle difference el between an angle of the end point line segment PN[m] selected in step S2201 and the standard azimuth θB is equal to or less than a predetermined value (Thθmax) is determined. In other words, whether or not the end point line segment is in parallel to the standard azimuth is determined in step S2203. When it is determined that the angle difference θ is equal to or less than the predetermined value, the processing proceeds to step S2204, and when it is determined that the angle difference θ is greater than the predetermined value, the processing proceeds to step S2206.

When the determination is affirmative in step S2203, the processing proceeds to step S2204, and whether or not a length L of the endpoint line segment PN[m] is within a predetermined range (ThLmin or greater and ThLmax or less) is determined. In other words, whether or not an interval of the end point line segment constituting a short side of a parking bay corresponds to a width of the parking bay is determined in step S2204. When it is determined that the length L is within the predetermined range, the processing proceeds to step S2205, and when it is determined that the length L is not within the predetermined range, the processing proceeds to step S2206.

When the determination is affirmative in step S2204, the processing proceeds to step S2205, and coordinates of four corners of a rectangular parking bay with the endpoint line segment PN[m] as a short side are registered as position information PS[k]. Here, coordinates obtained based on the endpoint line segment correspond to two points in the front of the parking bay, and end point positions within the parking bay are not sensed, and thus interpolation is performed by using a length of the host vehicle, or the like.

When step S2205 is performed, the processing proceeds to step S2206, and whether or not the processing described above is performed for all endpoint features (an entrance line of a parking bay) based on the information output from the end point feature distinguishing unit 3061 is confirmed. When the determination is affirmative in step S2206, a result obtained by the processing described above is output and the processing performed by the parking bay recognition unit 3071 ends. When the determination is negative in step S2206, the processing returns to step S2201.

Contents of a processing of recognizing a parking bay, which is different from the processing performed by the parking bay recognition unit 3071 described above will be described with reference to FIG. 23. FIG. 23 is a flowchart illustrating a flow of another processing performed by the parking bay recognition unit 3071.

First, in step S2301, two end point line segments PN[m] are selected. Hereinafter, the end point line segments PN[m] are end point line segments PN[m1] and PN[m2].

Then, in step S2302, whether or not a length difference ΔL between the two endpoint line segments PN[m1] and PN[m2] selected in step S2301 is within a predetermined range (ThΔLmin or greater and ThΔLmax or less) is determined. In other words, whether or not there is another line segment which has a length similar to a length of an end point line segment constituting a short side of a parking bay is confirmed in step S2302. When it is determined that the length difference ΔL is within the predetermined range, the processing proceeds to step S2303, and when it is determined that the length difference ΔL is not within the predetermined range, the processing proceeds to step S2305.

When the determination is affirmative in step S2302, the processing proceeds to step S2303, and whether or not an angle difference Δθ between the endpoint line segments PN[m1] and PN[m2] selected in step S2301 is equal to or less than a predetermined value (Thθmax) is determined. In other words, whether or not the two end point line segments are in parallel to each other is determined in step S2303. When it is determined that the angle difference Δθ is equal to or less than the predetermined value, the processing proceeds to step S2304, and when it is determined that the angle difference Δθ is greater than the predetermined value, the processing proceeds to step S2305.

When the determination is affirmative in step S2303, the processing proceeds to step S2304, and coordinates of four corners of a rectangle parking bay with the endpoint line segment PN[m1], which is a standard, as a short side are registered as position information PS[k]. Here, coordinates obtained based on the end point line segment correspond to two points in the front of the parking bay, and end point positions within the parking bay are not sensed, and thus interpolation is performed by using a length of the host vehicle, or the like.

When step S2304 is performed, the processing proceeds to step S2305, and whether or not the processing described above is performed for all endpoint features (an entrance line of a parking bay) based on the information output from the end point feature distinguishing unit 3061 is confirmed. When the determination is affirmative in step S2305, a result obtained by the processing described above is output and the processing performed by the parking bay recognition unit 3071 ends. When the determination is negative in step S2305, the processing returns to step S2301.

In the processing in FIG. 23, in a case where two or more parking bays are sensed, it is possible to further reduce misrecognition in comparison to a case where the determination is performed only with a single end point line segment as in the processing in FIG. 22.

Other configurations and operations are approximately the same as the configurations and the operations of the vehicle-mounted image processing device 1000 according to the above-described first embodiment, thus a detailed description thereof will be omitted.

As described above, when a parking bay, in which paintings are present only at four corners of the parking bay illustrated in (1) in FIG. 20A and (1) in FIG. 20B, is sensed, a situation, in which a pattern of stopped vehicles on the left and the right of the parking bay, such as a license plate, is misrecognized as a part of the parking bay, occurs as illustrated in FIG. 21D. In this regard, the misrecognition can be eliminated in the vehicle-mounted image processing device 3000 according to the third embodiment, and almost the same effect as the effect of the vehicle-mounted image processing device 1000 according to the first embodiment described above can be obtained.

Fourth Embodiment

Figure 24:
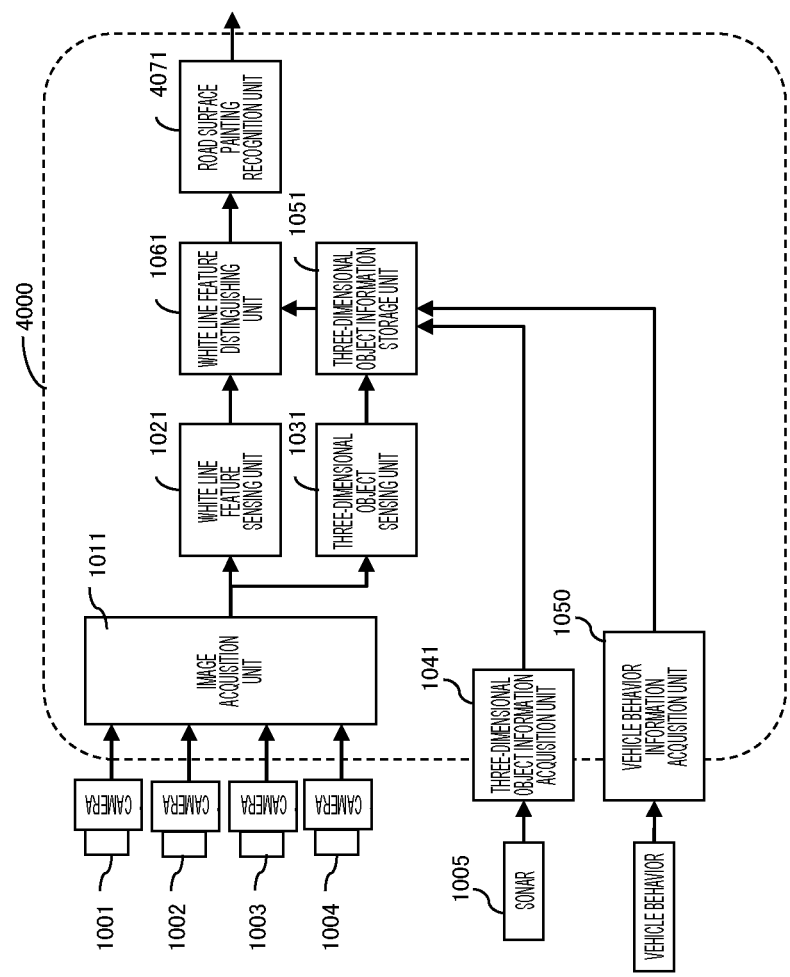
FIG. 24 is a block diagram of a vehicle-mounted image processing device according to a fourth embodiment of the present invention.
Figure 25:
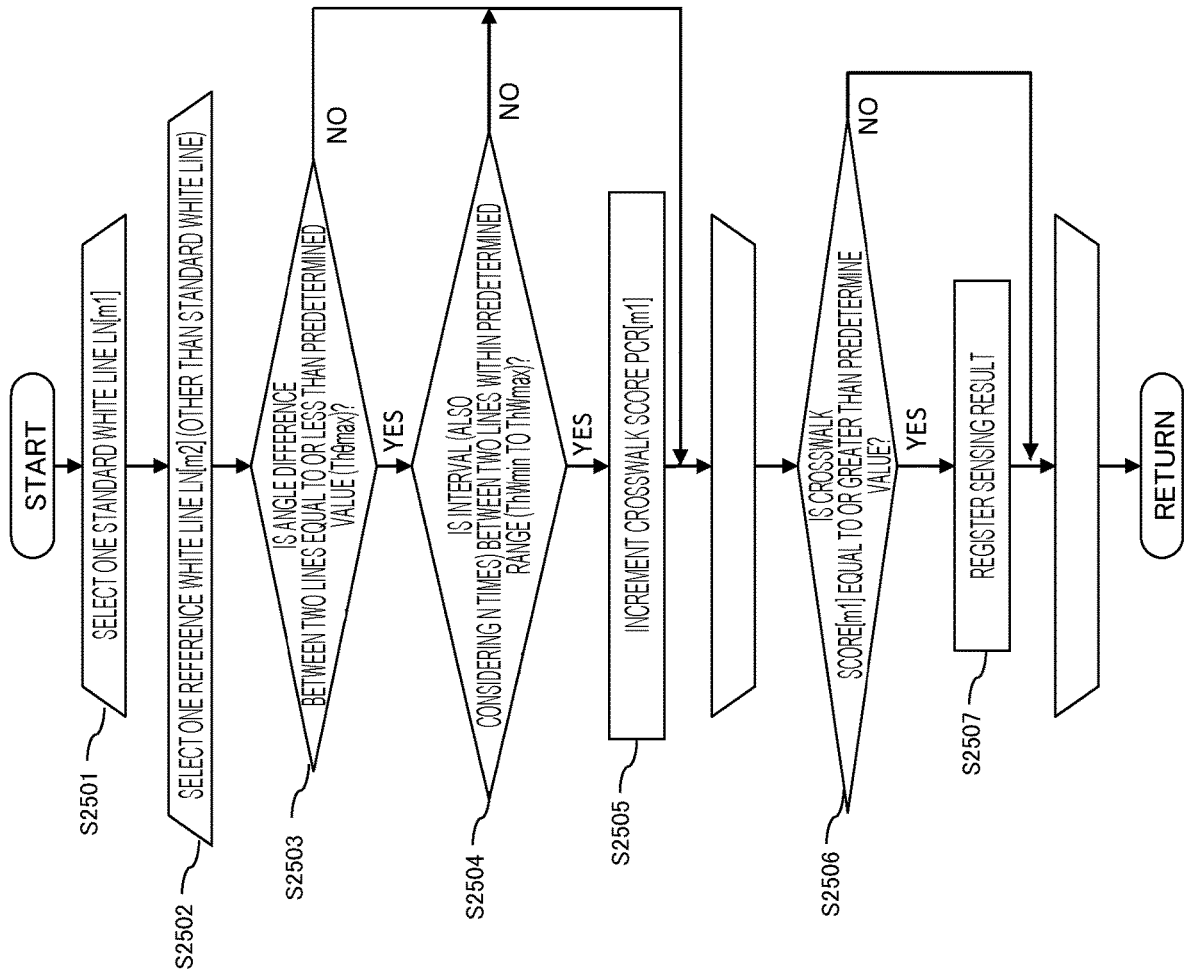
FIG. 25 is a flowchart illustrating a processing performed by a road surface painting recognition unit according to the fourth embodiment.

A vehicle-mounted image processing device according to a fourth embodiment of the present invention will be described with reference to FIGS. 24 and 25. FIG. 24 is a block diagram illustrating a configuration of a vehicle-mounted image processing device 4000 according to the fourth embodiment.

As illustrated in FIG. 24, the vehicle-mounted image processing device 4000 according to the present embodiment includes a road surface painting recognition unit (target object recognition unit) 4071, instead of the parking bay recognition unit 1071 of the vehicle-mounted image processing device 1000 according to the first embodiment.

The vehicle-mounted image processing device 4000 is a device which is embedded in a camera device mounted on a vehicle, an integrated controller, or the like, and senses an object in an image captured by cameras 1001 to 1004, and the vehicle-mounted image processing device 4000 according to the present embodiment is configured to sense a road surface painting as a target object.

The vehicle-mounted image processing device 4000 is constituted by a computer including a central processing unit (CPU), a memory, an I/O, and the like. A predetermined processing is programmed and is repeatedly performed in a predetermined cycle.

[Road Surface Painting Recognition Unit 4071]

Contents of a processing performed by the road surface painting recognition unit 4071 will be described with reference to FIG. 25. FIG. 25 is a flowchart showing a processing performed by the road surface painting recognition unit 4071.

The road surface painting recognition unit 4071 recognizes a pattern of a painting on a road surface by using LN[m] obtained by the white line feature distinguishing unit 1061. In the present embodiment, a processing of recognizing a crosswalk will be described.

First, in step S2501, one white line LN[m1] as a standard is selected.

Then, a reference white line LN[m2] is selected in step S2502, and a series of processing in steps S2503 to S2505 is performed for all white lines other than m1.

First, in step S2503, whether or not an angle difference el between the white line LN[m1] as a standard selected in step S2501 and the reference white line LN[m2] is equal to or less than a predetermined value (Thθmax) is determined. In other words, whether or not the two white lines are in parallel to each other is determined in step S2503. When it is determined that the angle difference el is equal to or less than the predetermined value, the processing proceeds to step S2504, and when it is determined that the angle difference el is greater than the predetermined value, a loop processing is continuously performed.

When the determination is affirmative in step S2503, the processing proceeds to step S2504, and whether or not an interval W between the two white lines LN[m1] and LN[m2] is within a predetermined range (ThWmin or greater and ThWmax or less) is determined. In other words, whether or not the two white lines are arranged at an interval corresponding to the crosswalk is determined in step S2504. When it is determined that the interval W is within the predetermined range, the processing proceeds to step S2505, and when it is determined that the interval W is not within the predetermined range, a loop processing is continuously performed.

Here, in the determination of the interval W, whether or not each of W/2, W/3, W/4, . . . is within the predetermined range is also determined. When any white line of the crosswalk is selected, an interval between the selected white line and an adjacent white line is within the predetermined range. However, when the next white line disposed after the adjacent white line adjacent to the selected white line is selected, the interval doubles and when a subsequent white line disposed after the next white line is selected, the interval triples. Therefore, it is determined that the interval W is within the predetermined range also in a case where any of the conditions described above is satisfied.

When the determination is affirmative in step S2504, the processing proceeds to S2505, and a crosswalk score PCR [m1] is incremented.

After performing the processing for all reference white lines LN[m2], the processing proceeds to step S2506, and whether the crosswalk score PCR[m1] is equal to or greater than a predetermined threshold value is determined. When the crosswalk score PCR[m1] is equal to or greater than the predetermined threshold value, the processing proceeds to step S2507. A coordinate values or a flag of the sensing result, or the like is registered as a sensing result, and when it is determined that the crosswalk score PCR[m1] is less than the threshold value, the next standard white line is selected and a loop processing is continuously performed to determine the crosswalk score PCR[m] with all white lines.

The determined information of the crosswalk is output to another control unit in the host vehicle 10, other than the vehicle-mounted image processing device 4000, and is used when another control unit performs each control such as an automatic driving control.

Other configurations and operations are approximately the same as the configurations and the operations of the vehicle-mounted image processing device 1000 according to the above-described first embodiment, thus a detailed description thereof will be omitted.

As described above, also when sensing a road surface painting, it is possible to eliminate a feature which is similar to the road surface painting and is present at an inner side of an obstacle by the vehicle-mounted image processing device 4000 according to the fourth embodiment, thereby making it possible to correctly recognize the road surface painting.

According to the fourth embodiment, the white line feature LC[n] sensed by the white line feature sensing unit 1021 and the white line LN[m] distinguished by the white line feature distinguishing unit 1061, which are used in the first embodiment, are used as the feature of the road surface painting. However, as described in the third embodiment, an end point feature PC[n] sensed by the end point feature sensing unit 3021 and an end point line segment PN[m] distinguished by the end point feature distinguishing unit 3061 can also be used.

In addition, although the crosswalk has been described by way of example in the present embodiment, another road surface painting (an arrow, a speed mark, a stop sign, or the like) can also be recognized by changing a condition of the road surface painting recognition unit 4071.

Fifth Embodiment

Figure 26:
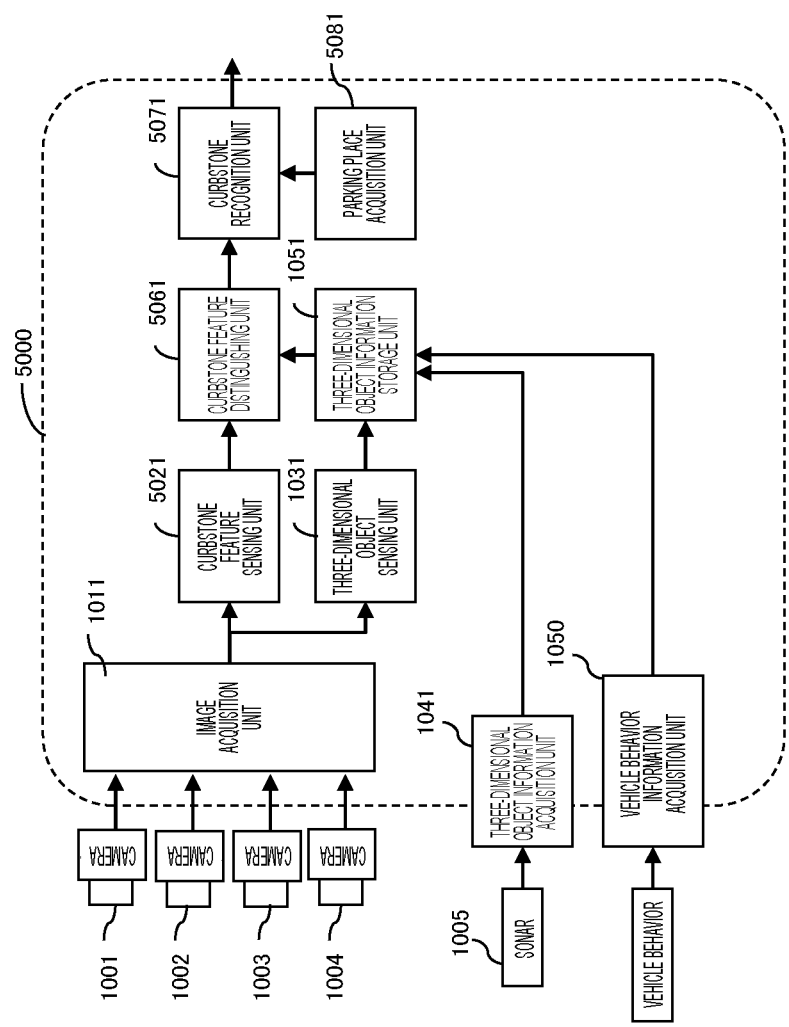
FIG. 26 is a block diagram of a vehicle-mounted image processing device according to a fifth embodiment of the present invention.
Figure 27:
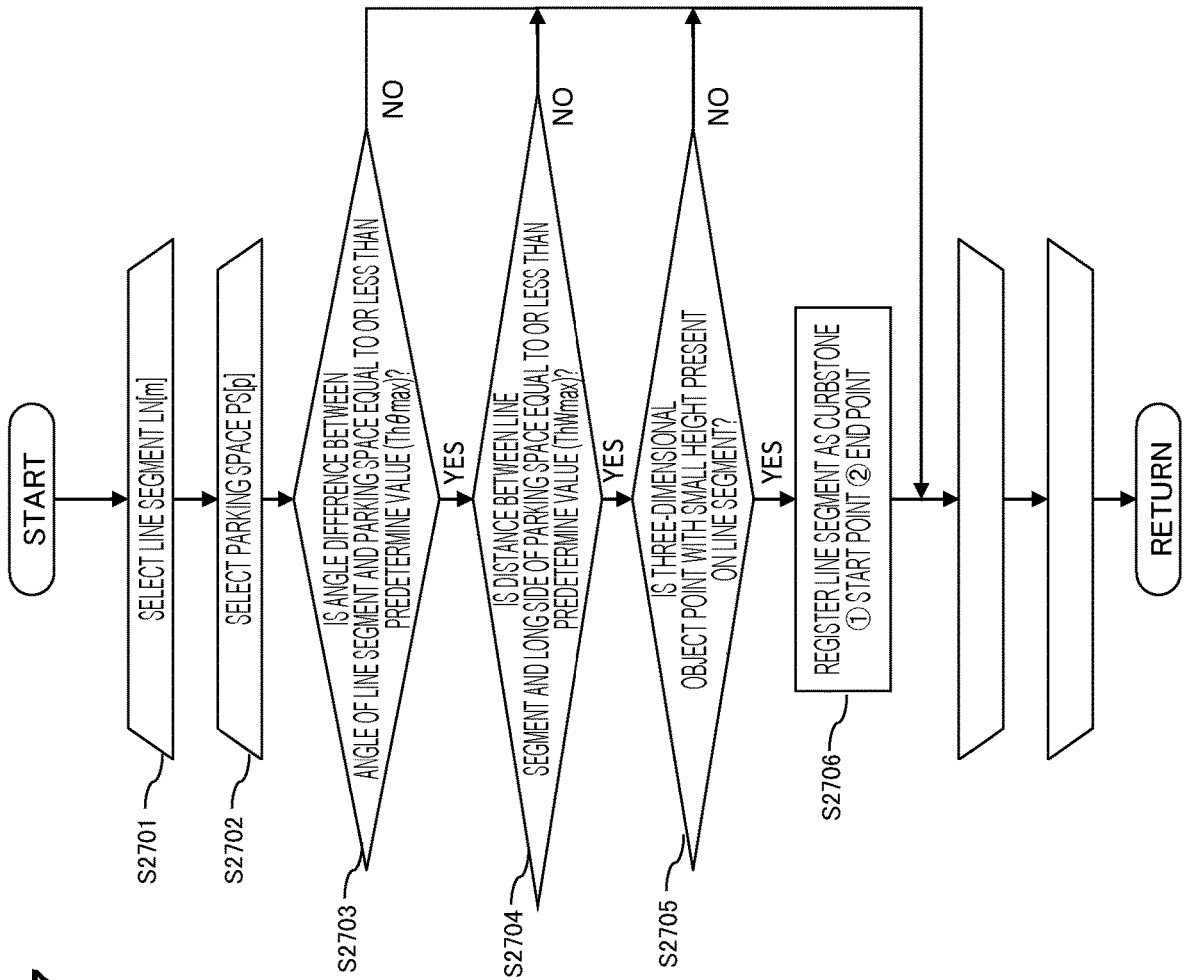
FIG. 27 is a flowchart illustrating a processing performed by a curbstone recognition unit according to the fifth embodiment.

A vehicle-mounted image processing device according to a fifth embodiment of the present invention will be described with reference to FIGS. 26 and 27. FIG. 26 is a block diagram illustrating a configuration of a vehicle-mounted image processing device 5000 according to the fifth embodiment.

As illustrated in FIG. 26, the vehicle-mounted image processing device 5000 according to the present embodiment is different from the vehicle-mounted image processing device 1000 according to the first embodiment in regard to the fact that the vehicle-mounted image processing device 5000 includes a curbstone feature sensing unit (feature amount extraction unit) 5021, a curbstone feature distinguishing unit (feature amount distinguishing unit) 5061, and a curbstone recognition unit (target object recognition unit) 5071, and further includes a parking space acquisition unit 5081.

The vehicle-mounted image processing device 5000 is a device which is embedded in a camera device mounted on a vehicle, an integrated controller, or the like, and senses an object in an image captured by cameras 1001 to 1004, and the vehicle-mounted image processing device 5000 according to the present embodiment is configured to sense a curbstone as a target object. The curbstone as a target object in the present embodiment is present near a region in which a plurality of parking bays are arranged, lies in parallel to a bay line, and is provided in parallel to a white line for parallel parking which is provided on a road.

The vehicle-mounted image processing device 5000 is constituted by a computer including a central processing unit (CPU), a memory, an I/O, and the like. A predetermined processing is programmed and is repeatedly performed in a predetermined cycle.

The curbstone feature sensing unit 5021 senses a line segment as a feature of the curbstone in an image IMG_C acquired by the image acquisition unit 1011. The curbstone feature sensing unit 5021 detects edges from the image by using a difference between a brightness of the curbstone and a brightness of a road surface, and senses a line segment by using an interval between a rising edge and a falling edge. This processing may be the same as the processing performed by the white line feature sensing unit 1021 used in the first embodiment, and thus a detailed description thereof will be omitted.

Similarly, a processing performed by the curbstone feature distinguishing unit 5061 may be the same as the processing performed by the white line feature distinguishing unit 1061 in the first embodiment, and thus a detailed description thereof will be omitted.

[Parking Space Acquisition Unit 5081]

The parking space acquisition unit 5081 recognizes a parking space around the host vehicle 10 and acquires rectangle information PS[p] of the parking space. The rectangle information PS[p] may be acquired as, for example, a result of parking bay recognition executed in the first embodiment described above, may be acquired by regarding a space generated between three-dimensional object point group OPT[d] in the three-dimensional object information storage unit 1051 as a parking bay, and can be acquired by known means. This processing can be executed by known means, a description thereof will be omitted.

[Curbstone Recognition Unit 5071]

Contents of a processing performed by the curbstone recognition unit 5071 will be described with reference to FIG. 27. FIG. 27 is a flowchart showing a processing performed by the curbstone recognition unit 5071.

The curbstone recognition unit 5071 recognizes a curbstone by using a line segment LN[m] obtained by the curbstone feature distinguishing unit 5061 and a parking space PS[p].

First, in step S2701, a line segment LN[m] is selected.

Then, a parking space PS[p] is selected in step S2702, and a series of processing in steps S2703 to S2705 is performed for all parking spaces PS[p].

First, in step S2703, whether or not an angle difference el between the line segment LN[m] selected in step S2701 and the parking space PS [p] is equal to or less than a predetermined value (Thθmax) is determined. In other words, whether or not the line segment is in parallel to the parking space is determined in step S2703. When it is determined that the angle difference θ is equal to or less than the predetermined value, the processing proceeds to step S2704, and when it is determined that the angle difference θ is greater than the predetermined value, a loop processing is continuously performed.

When the determination is affirmative in step S2703, the processing proceeds to step S2704, and whether or not an interval W between the line segment LN[m] and a long side of the parking space PS[p], which is positioned far away from the host vehicle, is equal to or less than a predetermined value (ThWmax) is determined. In other words, whether or not the line segment is present inside the parking space is determined in step S2704. When it is determined that the interval W is equal to or less than the predetermined value, the processing proceeds to step S2705, and when it is determined that the interval W is greater than the predetermined value, a loop processing is continuously performed.

When the determination is affirmative in step S2704, the processing proceeds to step S2705, and whether or not a point group of an object with a height equal to or less than a predetermined value is present on the line segment LN[m] is checked with reference to the three-dimensional object information OPT[d]. When it is determined that the object is present, the processing proceeds to step S2706, and when it is determined that the object is not present, a loop processing is continuously performed.

When the determination is affirmative in step S2705, the processing proceeds to S2706, and the line segment is registered as a curbstone. Registration information is information of a start point and an endpoint of the curbstone, that is, the line segment.

Although the case where a target object to be sensed is a curbstone has been described, the target object to be sensed can also be a wheel stopper in a parking bay. In this case, whether or not a bearing of a parking bay and an angle of a wheel stopper are orthogonal to each other is determined in step S2703, and an interval between the wheel stopper and a short side of the parking space PS[p], which is positioned far away from the host vehicle, is determined in step S2704.

Other configurations and operations are approximately the same as the configurations and the operations of the vehicle-mounted image processing device 1000 according to the first embodiment, thus a detailed description thereof will be omitted.

As described above, even in a case where an object with a small height such as a curbstone or a wheel stopper is sensed based on edge features in an image, it is possible to perform sensing with high accuracy without erroneous sensing by the vehicle-mounted image processing device 5000 according to the fifth embodiment, and almost the same effect as the effect of the vehicle-mounted image processing device 1000 according to the first embodiment described above can be obtained.

<Others>

It should be noted that the present invention is not limited to the embodiments described above, but includes various modified examples. The embodiments described above have been described in detail in order to facilitate understanding of the present invention, and are not necessarily limited to including all the configurations described above. In addition, a part of the configuration of one embodiment can be replaced with the configuration of another embodiment or the configuration of another embodiment can be added to the configuration of one embodiment. Further, it is possible to add, delete, and replace other configurations with respect to a part of the configuration of each embodiment.

REFERENCE SIGNS LIST

10 host vehicle
23 parking bay
23L parking bay line
1000,1100,1200,1300,2000,3000,4000,5000 vehicle-mounted image processing device
1001,1002,1003,1004 camera (imaging unit)
1005 sonar
1006 LiDAR
1011 image acquisition unit
1011A,1012A,1013A,1014A image
1015 overhead image
1021 white line feature sensing unit (feature amount extraction unit)
1031 three-dimensional object sensing unit
1041 three-dimensional object information acquisition unit
1050 vehicle behavior information acquisition unit
1051 three-dimensional object information storage unit
1061 white line feature distinguishing unit (feature amount distinguishing unit)
1071 parking bay recognition unit (target object recognition unit)
2061 white line feature distinguishing unit (feature amount distinguishing unit)
3021 end point feature sensing unit (feature amount extraction unit)
3061 end point feature distinguishing unit (feature amount distinguishing unit)
3071 parking bay recognition unit (target object recognition unit)
4071 road surface painting recognition unit (target object recognition unit)
5021 curbstone feature sensing unit (feature amount extraction unit)
5061 curbstone feature distinguishing unit (feature amount distinguishing unit)
5071 curbstone recognition unit (target object recognition unit)
5081 parking space acquisition unit

The invention claimed is:

1. A vehicle-mounted image processing device recognizing a target object around a host vehicle, the vehicle-mounted image processing device comprising:
a central processing unit; and
a memory coupled to the central processing unit and storing a program which, when executed by the central processing unit, causes the central processing unit to
acquire an image around the host vehicle captured by a camera;
extract, from the image around the host vehicle acquired by the camera, a feature amount of the target object and coordinate information of the feature amount with respect to the host vehicle when it is assumed that a feature having the feature amount is on a road surface;
acquire and store coordinate information of a three-dimensional object around the host vehicle with respect to the host vehicle;
distinguish whether the feature amount is a road surface feature amount of a feature on the road surface or a three-dimensional object feature amount of a feature on the three-dimensional object by using a positional relationship between the coordinate information of the feature amount with respect to the host vehicle and the coordinate information of the three-dimensional object stored with respect to the host vehicle;
recognize the target object by using the road surface feature amount;
sense a line segment as a line segment feature amount, and calculate coordinate information of a start point and an end point of the line segment with respect to the host vehicle, as the coordinate information of the feature amount with respect to the host vehicle;

distinguish whether the line segment feature amount is the road surface feature amount or the three-dimensional object feature amount by using a positional relationship between the coordinate information of the start point and the end point of the line segment with respect to the host vehicle and the coordinate information of the three-dimensional object with respect to the host vehicle; and calculate a triangle including a mounting position of the camera at which the feature amount is extracted, the start point of the line segment, and the end point of the line segment, determines whether or not the coordinate information of the three-dimensional object with respect to the host vehicle is present inside the triangle, determines that the feature amount is the road surface feature amount when it is determined that the coordinate information of the three-dimensional object with respect to the host vehicle is not present inside the triangle, and determines that the feature amount is the three-dimensional object feature amount when it is determined that the coordinate information of the three-dimensional object with respect to the host vehicle is present inside the triangle.

2. The vehicle-mounted image processing device according to claim 1, wherein the central processing unit senses edges from the image and senses, as the line segment, a line segment connecting a start point and an end point of the edges aligned in a straight line.

3. The vehicle-mounted image processing device according to claim 1, the program further causing the central processing unit to:

acquire the coordinate information of the three-dimensional object with respect to the host vehicle; and acquire behavior information of the host vehicle, and convert three-dimensional object information acquired in a past into relative coordinates from a current host vehicle position by using the coordinate information of the three-dimensional object with respect to the host vehicle and the behavior information of the host vehicle, and store accumulated information as coordinate information of the three-dimensional object around the host vehicle with respect to the host vehicle.

4. The vehicle-mounted image processing device according to claim 1, wherein the target object is a parking bay, and the central processing unit selects two line segments which have features having feature amounts determined as feature amounts of features on the road surface, and recognizes the parking bay by using conditions including an interval and an angle difference between the two line segments.

5. The vehicle-mounted image processing device according to claim 1, wherein the central processing unit performs a rectangle approximation for the coordinate information of the three-dimensional object with respect to the host vehicle, determines whether or not the line segment is at least partially present inside the coordinate information of the three-dimensional object with respect to the host vehicle subjected to the rectangle approximation, determines that the feature amount is the road surface feature amount when it is determined that the line segment is not at least partially present inside the coordinate information of the three-dimensional object with respect to the host vehicle subjected to the rectangle approximation, and determines that the feature amount is the three-dimensional object feature amount when it is determined that the line segment is at least partially present inside the coordinate information of the three-dimensional object with respect to the host vehicle subjected to the rectangle approximation.

6. The vehicle-mounted image processing device according to claim 1, wherein the central processing unit senses corner points from the image and senses, as a start point and an end point, a line segment with a combination of corner points, of which symmetry between image patterns around the corner points is equal to or greater than a predetermined standard value, among two combinations of the corner points.

7. The vehicle-mounted image processing device according to claim 6, wherein the target object is a parking bay, and the central processing unit selects one line segment which is the road surface feature amount, and recognizes the parking bay by using a condition including a length of the selected line segment.

8. The vehicle-mounted image processing device according to claim 1, wherein the target object is a road surface painting, and the central processing unit selects a plurality of line segments which have features having feature amounts determined as road surface feature amounts of features on the road surface, and recognizes the road surface painting by using a positional relationship among the plurality of selected line segments.

9. The vehicle-mounted image processing device according to claim 2, wherein the target object is a curbstone or a wheel stopper, the central processing unit acquires a parking space around the host vehicle, and the central processing unit recognizes the target object by using a bearing relationship between the feature amount determined as a feature amount of a feature on the road surface and the parking space, and a positional relationship between the road surface feature amount and the parking space.

* * * * *